US012801164B2

(12) United States Patent
Kondo

(10) Patent No.: US 12,801,164 B2
(45) Date of Patent: Nov. 17, 2026

(54) SERVER AND OPERATION SYSTEM

(71) Applicant: TOYOTA JIDOSHA KABUSHIKI KAISHA, Toyota (JP)

(72) Inventor: Kenji Kondo, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 18/608,066

(22) Filed: Mar. 18, 2024

(65) Prior Publication Data

US 2024/0353864 A1 Oct. 24, 2024

(30) Foreign Application Priority Data

Apr. 21, 2023 (JP) ................................ 2023-069975

(51) Int. Cl.

| | |
|---|---|
| ***G05D 1/692*** | (2024.01) |
| ***B60W 60/00*** | (2020.01) |
| *G06Q 10/02* | (2012.01) |
| *G06Q 10/047* | (2023.01) |
| *G06Q 10/063* | (2023.01) |
| *G06Q 10/0631* | (2023.01) |
| *G06Q 10/083* | (2023.01) |
| *G06Q 10/20* | (2023.01) |

(Continued)

(52) U.S. Cl.

CPC ......... *G05D 1/692* (2024.01); *B60W 60/0023* (2020.02); *B60W 2530/209* (2020.02); *G06Q 10/02* (2013.01); *G06Q 10/047* (2013.01); *G06Q 10/063* (2013.01); *G06Q 10/0631* (2013.01); *G06Q 10/083* (2013.01); *G06Q 10/08355* (2013.01); *G06Q 10/20* (2013.01); *G06Q 50/06* (2013.01); *G06Q 50/40* (2024.01)

(58) Field of Classification Search

CPC .............. G05D 1/692; B60W 60/0023; B60W 2530/209; G06Q 10/02; G06Q 10/047; G06Q 10/063; G06Q 10/083; G06Q 10/20; G06Q 50/06; G06Q 50/40; G06Q 10/0631; G06Q 10/08355

USPC ........................................................... 701/23

See application file for complete search history.

(56) References Cited

U.S. PATENT DOCUMENTS 5,220,263 A 6/1993 Onishi et al.
9,026,347 B2 * 5/2015 Gadh ...................... B60L 53/67 320/132

(Continued)

FOREIGN PATENT DOCUMENTS

JP 03-284103 A 12/1991
JP 2023-012203 A 1/2023

*Primary Examiner* — Jelani A Smith
*Assistant Examiner* — Dana D Ivey
(74) *Attorney, Agent, or Firm* — Sughrue Mion, PLLC

(57) ABSTRACT

A server that manages a plurality of moving objects, the server includes a processor configured to: determine an operation plan for each of the moving objects, and instruct each of the moving objects to operate according to the determined operation plan, the operation plan including a plan regarding energy replenishment for operation, determine based on the operation plan whether a conflict is going to occur, the conflict being two or more of the moving objects being replenished with energy at a same location at a same timing, and when determination is made that the conflict is going to occur, change the operation plan of at least one of the conflicting moving objects in such a manner that the conflict is avoided.

5 Claims, 10 Drawing Sheets

(51) Int. Cl.
*G06Q 50/06* (2012.01)
*G06Q 50/40* (2024.01)

(56) References Cited

U.S. PATENT DOCUMENTS

| | | | | |
|---|---|---|---|---|
| 2018/0113464 | A1* | 4/2018 | Bostick | G06Q 10/04 |
| 2020/0001727 | A1* | 1/2020 | Li | B60L 50/62 |
| 2021/0163041 | A1* | 6/2021 | Kojo | B60W 60/0023 |
| 2021/0213848 | A1* | 7/2021 | Sun | B60L 53/66 |

* cited by examiner

< OPERATION PLAN >

| VEHICLE ID | STATUS | OPERATING SECTION | | | | NON-OPERATING SECTION | |
|---|---|---|---|---|---|---|---|
| | | TASK | START | MOVE | END | REPLENISHMENT POINT AND MOVEMENT CONDITIONS | ··· |
| ID-** | **** | ** | ** | ** | ** | **** | ··· |
| ID-** | **** | ** | ** | ** | ** | **** | ··· |
| ⋮ | ⋮ | ⋮ | ⋮ | ⋮ | ⋮ | ⋮ | ··· |

SERVER AND OPERATION SYSTEM

CROSS-REFERENCE TO RELATED APPLICATION

This application claims priority to Japanese Patent Application No. 2023-069975 filed on Apr. 21, 2023, incorporated herein by reference in its entirety.

BACKGROUND

1. Technical Field

The present disclosure relates to servers and operation systems.

2. Description of Related Art

Japanese Unexamined Patent Application Publication No. 2023-012203 (JP 2023-012203 A) discloses an operation system that can reduce the risk of a battery electric bus running out of traction power due to a decrease in full charge capacity of its battery.

SUMMARY

In the operation system described in JP 2023-012203 A, the operation efficiency can be improved by increasing the number of operating sections in an operation plan or by increasing the task amount in the operating sections. In JP 2023-012203 A, transport of people is a task, and the amount of transport (i.e, the number of people) is a task amount. In the operation plan, a section where a moving object (e.g., the bus described in JP 2023-012203 A) executes a task is an operating section. An operating section is, for example, a section from a task start point to a task end point.

However, JP 2023-012203 A does not mention anything about the relationship between the operation efficiency and the operational resources. The operation efficiency can be represented by the task amount divided by the amount of operational resources (=task amount/amount of operational resources). The operational resources are resources necessary for operation. Examples of the operational resources include moving objects, energy for operating the moving objects, and energy replenishment points. The more the operational resources, the lower the operation efficiency. Therefore, the technique described in JP 2023-012203 A does not necessarily provide sufficient operation efficiency. There is still room for improvement in the technique described in JP 2023-012203 A.

The present disclosure provides a server and operation system that facilitate an increase in operation efficiency while reducing an increase in amount of operational resources.

A first aspect of the present disclosure provides a server as described below. A server that manages a plurality of moving objects includes a processor. The processor is configured to: determine an operation plan for each of the moving objects, and instruct each of the moving objects to operate according to the determined operation plan, the operation plan including a plan regarding energy replenishment for operation, determine based on the operation plan whether a conflict is going to occur, the conflict being two or more of the moving objects being replenished with energy at a same location at a same timing, and when determination is made that the conflict is going to occur, change the operation plan of at least one of the conflicting moving objects in such a manner that the conflict is avoided.

Since the moving objects consume energy due to the operation, it is necessary to replenish the moving objects with energy in a planned manner for continuous operation. Energy replenishment points are one of operational resources. Increasing the number of energy replenishment points facilitates an increase in task amount. However, if the number of energy replenishment points is increased too much, reduction in operation efficiency due to the increase in the number of energy replenishment points will have a greater impact than improvement in operation efficiency due to the increase in task amount, which rather reduces the operation efficiency. In particular, increasing the number of energy replenishment points in areas with high land prices (e.g., urban areas) will be accompanied by reduction in operation efficiency (=task amount/operational resources price) from an economic perspective. Therefore, in order to increase the operation efficiency, it is desirable for a plurality of moving objects to effectively use limited energy replenishment points.

However, in an operation system with a small number of usable energy replenishment points, conflicts between or among two or more moving bodies at the energy replenishment point (that is, two or more moving bodies staying at the same energy replenishment point at the same timing) tend to occur. Even if the operation plan for each of the moving objects is set so that no conflict will occur, conflicts may still occur depending on the situation on the day the operation plan is to be executed (scheduled day). In this regard, the server is configured to, when determination is made that a conflict is going to occur, change the operation plan of at least one of the conflicting moving objects in such a manner that the conflict is avoided. Therefore, the server can determine the operation plan so that the conflict is avoided according to, for example, the situation on the scheduled day. This allows the moving objects to effectively use the limited energy replenishment points. As described above, the server causes the moving objects to operate cooperatively in a non-operating section, which facilitates an increase in operation efficiency. The above server facilitates an increase in operation efficiency while reducing an increase in amount of operational resources.

The moving object may be an electrified vehicle (hereinafter also referred to as "xEV") that uses electric power as all or part of its power source, or may be an internal combustion engine vehicle. Examples of the xEV include a battery electric vehicle (BEV), a plug-in hybrid electric vehicle (PHEV), a hybrid electric vehicle (HEV), and a fuel cell electric vehicle (FCEV).

The server according to the above aspect may have the configuration described below.

The server according to the above aspect may further include the following feature. The operation plan may include an energy replenishment point and a period of stay at the energy replenishment point. The processor may be configured to, when determination is made based on the operation plan that a preceding first moving object and a following second moving object are going to conflict at the energy replenishment point, and a remaining amount of energy in the first moving object at a conflict occurrence time predicted from the operation plan is greater than a reference amount, change the period of stay of the first moving object at the energy replenishment point, before instructing each of the moving objects to operate, in such a manner that the first moving object departs from the energy replenishment point at the conflict occurrence time.

According to the above configuration, the conflict is more likely to be appropriately avoided without changing the routes of the first and second moving objects.

The server according to the above aspect may further include the following feature. The processor may be configured to, when, before instructing each of the moving objects to operate, determination is made based on the operation plan that the first moving object and the second moving object are going to conflict at the energy replenishment point, and the remaining amount of energy in the first moving object at the conflict occurrence time is less than the reference amount, change the period of stay of the first moving object at the energy replenishment point in such a manner that the first moving object departs from the energy replenishment point at a timing when the remaining amount of energy in the first moving object reaches the reference amount.

According to the above configuration, the conflict is more likely to be appropriately avoided without changing the routes of the first and second moving objects, while reducing the risk of the first moving object running out of energy.

The server according to the above aspect may further include the following feature. The server processor may be configured to change an energy replenishment point in the operation plan of at least one of the conflicting moving objects in such a manner that the conflict is avoided.

According to the above configuration, conflict avoidance by changing the route can be performed as one conflict avoidance method.

The server according to the above aspect may further include the following feature. The server processor may be configured to, when there is a plurality of the operation plans that is able to avoid the conflict, select the operation plan with a lowest risk of running out of energy out of the operation plans.

The above configuration facilitates an increase in operation efficiency while reducing the risk of running out of energy. The server may change an arbitration protocol for conflict avoidance so that the risk of running out of energy is reduced.

The server according to the above aspect may further include the following feature. The processor may be configured to, when there is a plurality of the operation plans that is able to avoid the conflict, select the operation plan with highest energy efficiency out of the operation plans.

The above configuration facilitates an increase in operation efficiency while reducing an increase in energy for operating the moving objects. The server may change an arbitration protocol for conflict avoidance so that the energy efficiency is improved.

The server may use any of the above conflict avoidance methods according to the situation.

A second aspect of the present disclosure provides an operation system as described below.

The operation system includes: the server according to the above aspect; and the moving bodies that receive an instruction from the server.

In the above operation system, the server facilitates an increase in operation efficiency while reducing an increase in amount of operational resources.

The operation system according to the above aspect may further include the following feature. The moving objects may include a third moving object and a fourth moving object. Each of the third moving object and the fourth moving object may be an autonomous vehicle. The third moving object instructed to operate according to the operation plan including a schedule in which the third moving object and the fourth moving object are switched at an energy replenishment point may be configured to depart from the energy replenishment point when the fourth moving object approaches the energy replenishment point while the third moving object is staying at the energy replenishment point.

According to the above configuration, the fourth moving object is more likely to enter the energy replenishment point exactly when the third moving object leaves that energy replenishment point. Autonomous driving can more easily accurately control the travel conditions compared to manual driving by a driver.

The present disclosure facilitates an increase in operation efficiency while reducing an increase in amount of operational resources.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described in detail below with reference to the drawings. The same or corresponding portions are denoted by the same signs throughout the drawings, and description thereof will not be repeated.

Figure 1:
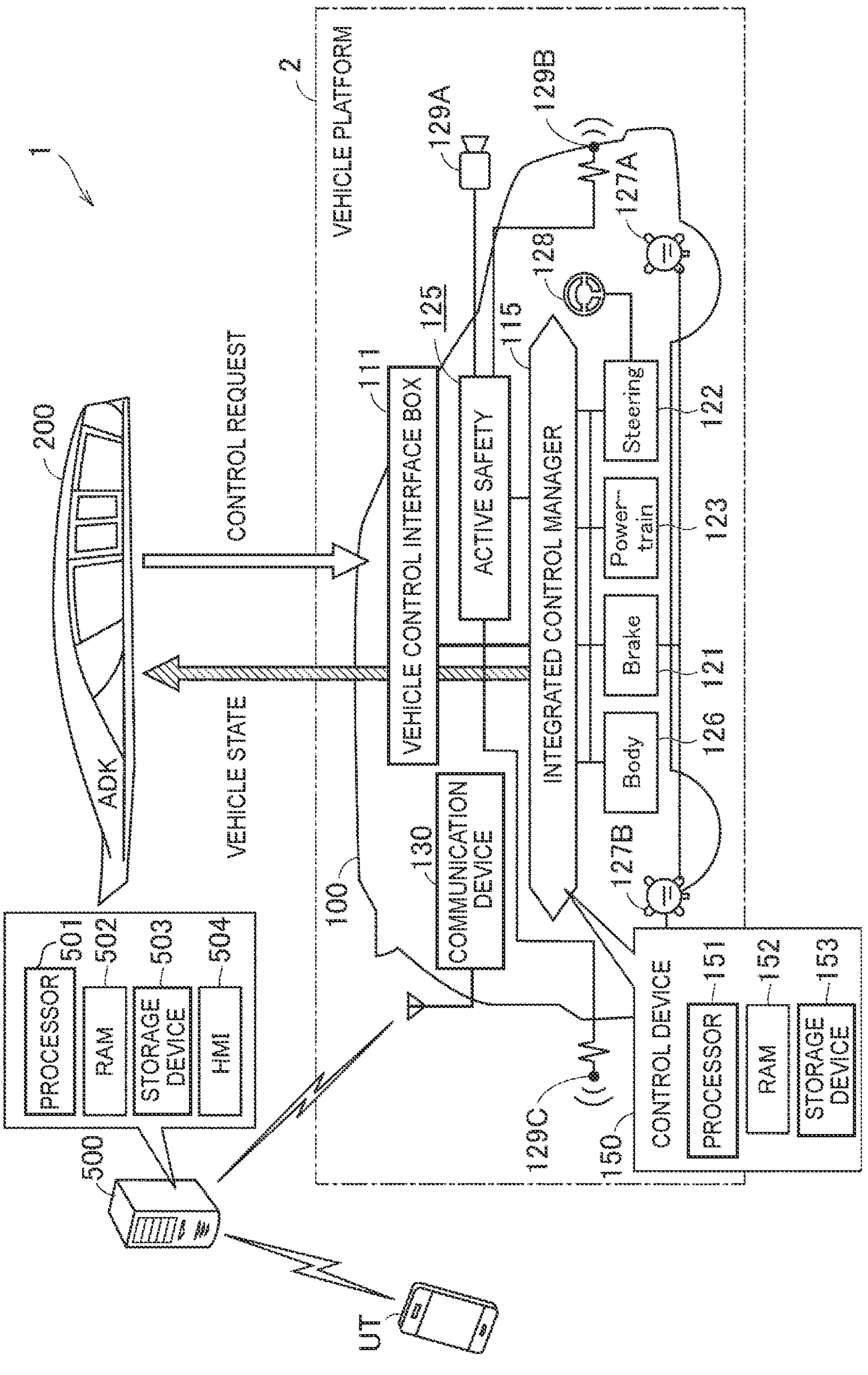
FIG. 1 shows a schematic configuration of a vehicle according to an embodiment of the present disclosure.

FIG. 1 shows a schematic configuration of a vehicle according to the embodiment of the present disclosure. Referring to FIG. 1, a vehicle 1 includes an autonomous driving kit (ADK) 200 and a vehicle platform (VP) 2.

The VP 2 includes a base vehicle 100 and a vehicle control interface box (VCIB) 111. The VP 2 to and from which the ADK 200 can be attached and detached can be formed by adding the VCIB 111 to the base vehicle 100. The vehicle 1 is completed by attaching the ADK 200 to the VP 2. The VCIB 111 may communicate with the ADK 200 through an in-vehicle network such as a Controller Area Network (CAN). Although the base vehicle 100 and the ADK 200 are shown apart from each other in FIG. 1, the ADK 200 is actually attached to the base vehicle 100. In the present embodiment, the ADK 200 is attached to a rooftop of the base vehicle 100. The attachment position of the ADK 200 may be changed as appropriate.

The base vehicle 100 is, for example, a commercially available electrified vehicle (xEV). In the present embodiment, the base vehicle 100 is a battery electric vehicle (BEV). However, the base vehicle 100 is not limited to the BEV, and may be an xEV other than the BEV (hybrid electric vehicle (HEV), plug-in hybrid electric vehicle (PHEV), fuel cell electric vehicle (FCEV), etc.). The base vehicle 100 includes, for example, four wheels. However, the number of wheels of the base vehicle 100 is not limited to four, and the base vehicle 100 may include three wheels, or five or more wheels.

A control system of the base vehicle 100 includes an integrated control manager 115 and various systems and sensors for controlling the base vehicle 100. The integrated control manager 115 integrates and controls the various systems related to the operation of the base vehicle 100 based on signals from the various sensors in the base vehicle 100 (sensor detection signals).

In the present embodiment, the integrated control manager 115 includes a control device 150. The control device 150 includes a processor 151, a random access memory (RAM) 152, and a storage device 153. The processor 151 may be, for example, a central processing unit (CPU). The RAM 152 functions as a working memory for temporarily storing data to be processed by the processor 151. The storage device 153 is configured to save stored information. The storage device 153 may include, for example, a read-only memory (ROM) and a rewritable nonvolatile memory. The storage device 153 stores programs and information to be used in the programs (e.g., maps, expressions, and various parameters). In the present embodiment, various vehicle controls (e.g., autonomous driving control according to instructions from the ADK 200) are performed by the processor 151 executing the programs stored in the storage device 153. However, these controls may be performed by dedicated hardware (electronic circuitry) rather than by software. The control device 150 may include any number of processors, and a processor may be prepared for each predetermined control.

The base vehicle 100 includes a brake system 121, a steering system 122, a powertrain system 123, an active safety system 125, and a body system 126. The integrated control manager 115 integrate and control these systems. In the present embodiment, each system includes a computer. The computer of each system communicates with the integrated control manager 115 through the in-vehicle network (e.g., CAN). The computer of each system is hereinafter referred to as "electronic control unit (ECU)."

The brake system 121 includes a braking device provided for each wheel of the base vehicle 100 and an ECU that controls the braking devices. In the present embodiment, the braking devices are hydraulic disc brake devices. The base vehicle 100 includes wheel speed sensors 127A, 127B. The wheel speed sensor 127A is mounted on a front wheel of the base vehicle 100 and detects the rotational speed of the front wheel. The wheel speed sensor 127B is mounted on a rear wheel of the base vehicle 100 and detects the rotational speed of the rear wheel. The ECU of the brake system 121 outputs the rotational direction and rotational speed of each wheel detected by the wheel speed sensors 127A, 127B to the integrated control manager 115. The integrated control manager 115 may calculate the travel speed of the vehicle 1 (vehicle speed) based on detection signals from the wheel speed sensors 127A, 127B.

The steering system 122 includes a steering device of the base vehicle 100 and an ECU that controls the steering device. The steering device includes, for example, a rack and pinion electric power steering (EPS) device whose steering angle can be adjusted by an actuator. The base vehicle 100 includes a pinion angle sensor 128. The pinion angle sensor 128 detects the rotation angle (pinion angle) of a pinion gear connected to a rotating shaft of the actuator of the steering device. The ECU of the steering system 122 outputs the pinion angle detected by the pinion angle sensor 128 to the integrated control manager 115.

The powertrain system 123 includes an electric parking brake (EPB) mounted on at least one of the wheels of the base vehicle 100, a parking lock (P-lock) device mounted on a transmission of the base vehicle 100, a shift device configured to select a shift range, a driving source for the base vehicle 100, and an ECU that controls each device included in the powertrain system 123. The EPB is provided separately from the braking devices, and holds the wheel locked by an electric actuator. For example, the P-lock device mechanically locks the rotational position of an output shaft of the transmission using a parking lock pawl that can be driven by an actuator. As will be described in detail later, in the present embodiment, the driving source for the base vehicle 100 is a motor that is supplied with power from a battery. The ECU of the powertrain system 123 outputs, to the integrated control manager 115, information on the presence or absence of the locking by the EPB and the P-lock device, the shift range selected by the shift device, and the states of the battery and motor (see FIG. 3 described later).

The active safety system 125 includes an ECU that determines the possibility of a collision of the vehicle 1 while the vehicle 1 is traveling. The base vehicle 100 includes a camera 129A and radar sensors 129B, 129C that detect the surroundings of the vehicle 1 including the areas in front of and behind the vehicle 1. The ECU of the active safety system 125 determines whether there is a possibility of a collision using signals received from the camera 129A and the radar sensors 129B, 129C. When the active safety system 125 determines that there is a possibility of a collision, the integrated control manager 115 outputs a braking command to the brake system 121 to increase the braking force of the vehicle 1. The base vehicle 100 according to the present embodiment includes the active safety system 125 as a factory default component (at the time of shipment). However, the base vehicle 100 does not necessarily include the active safety system 125 as a factory default component, and an active safety system that is retrofittable to the base vehicle 100 may be used.

The body system 126 includes body parts (e.g. turn signals, a horn, and windshield wipers) and an ECU that controls the body parts. When in a manual mode, the ECU of the body system 126 controls the body parts according to user operations. When in an autonomous mode, the ECU of the body system 126 controls the body parts according to commands received from the ADK 200 via the VCIB 111 and the integrated control manager 115.

The vehicle 1 is configured to drive autonomously. The VCIB 111 functions as a vehicle control interface. When the vehicle 1 travels by autonomous driving, the integrated control manager 115 and the ADK 200 send and receive signals to and from each other via the VCIB 111, and the integrated control manager 115 performs travel control in the autonomous mode (that is, autonomous driving control) according to commands from the ADK 200. The ADK 200 is detachable from the base vehicle 100. Even with the ADK 200 detached from the base vehicle 100, the base vehicle 100 can travel as driven by a user. When the base vehicle 100 travels without the ADK 200, the control system of the base vehicle 100 performs travel control in the manual mode (that is, travel control according to user operations). The integrated control manager 115 may switch between the autonomous mode and the manual mode according to instructions from a person who manages the vehicle 1 or a server 500.

In the present embodiment, the ADK 200 sends and receives signals to and from the VCIB 111 based on an application program interface (API) that defines signals to be communicated. The ADK 200 is configured to process various signals defined by the API. For example, the ADK 200 creates a travel plan for the vehicle 1 and outputs various commands requesting control for causing the vehicle 1 to travel according to the created travel plan to the VCIB 111 based on the API. The control device 150 of the integrated control manager 115 sends various signals indicating the state of the base vehicle 100 detected by the control system of the base vehicle 100 (e.g., sensor signals or status signals) to the ADK 200 via the VCIB 111. The VCIB 111 converts signals between the ADK 200 and the base vehicle 100 to allow the base vehicle 100 (integrated control manager 115) to perform vehicle control according to commands from the ADK 200.

The base vehicle 100 further includes a communication device 130. The communication device 130 includes various communication interfaces (I/Fs). The control device 150 is configured to communicate with devices outside the vehicle 1 (e.g., the server 500 described later) through the communication device 130. The communication device 130 includes a wireless communication device (e.g., a Data Communication Module (DCM)) that can access a mobile communication network (telematics).

Mobile equipment UT is a terminal carried by the user of the vehicle 1. In the present embodiment, the mobile equipment UT is a smartphone with a touch panel display. However, the mobile equipment UT is not limited to the smartphone, and may be any mobile equipment such as a laptop computer, a tablet, a wearable device (e.g., a smartwatch or smart glasses), or an electronic key.

The vehicle 1 can be used as one component of a Mobility-as-a-Service (MaaS) system. The MaaS system includes, for example, a Mobility Service Platform (MSPF). The MSPF is a unified platform connected to various mobility services (e.g., various mobility services provided by ridesharing companies, car sharing companies, insurance companies, car rental companies, and taxi companies). The server 500 is a computer that manages and releases to the public information for the mobility services on the MSPF. The server 500 manages information on various mobilities and provides information (e.g., an API and information on cooperation between mobilities) in response to requests from business operators. The business operators that provide services can use various functions provided by the MSPF by using an API publicly available on the MSPF. For example, an API that is required to develop an ADK is publicly available on the MSPF.

The server 500 includes a processor 501, a RAM 502, a storage device 503, and a human-machine interface (HMI) 504. The storage device 503 is configured to save stored information. The storage device 503 stores programs and information to be used in the programs (e.g., maps, expressions, and various parameters). The HMI 504 includes an input device and a display device. The HMI 504 may be a touch panel display. The HMI 504 may include a smart speaker that receives voice input.

Figure 2:
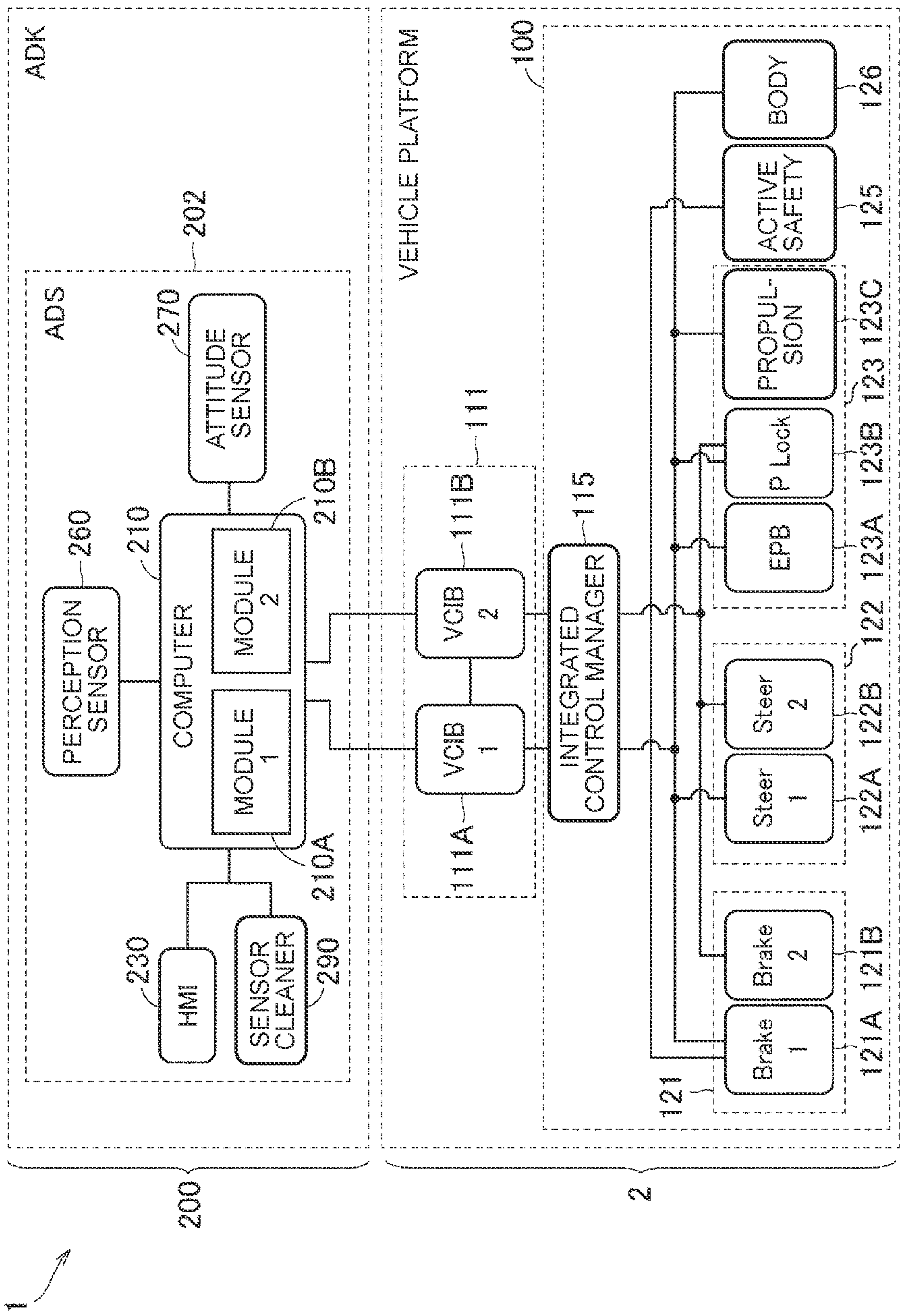
FIG. 2 shows details of a control system of the vehicle shown in FIG. 1.

FIG. 2 shows details of the control system of the vehicle 1. Referring to FIG. 2 together with FIG. 1, the ADK 200 includes an autonomous driving system (ADS) 202 for autonomously driving the vehicle 1. The ADS 202 includes a computer 210, an HMI 230, a perception sensor 260, an attitude sensor 270, and a sensor cleaner 290.

The computer 210 includes a processor and a storage device storing autonomous driving software using the API, and is configured so that the processor can execute the autonomous driving software. Control related to autonomous driving is performed by the autonomous driving software. The autonomous driving software may be updated over the air (OTA) as needed. The computer 210 further includes arithmetic modules 210A, 210B.

The HMI 230 is a device that allows the user and the computer 210 to send and receive information to and from each other. The HMI 230 includes an input device and a notification device. Through the HMI 230, the user can send instructions or requests to the computer 210 and can change the values of parameters that are used in the autonomous driving software (the parameters are limited to those that are permitted to be changed in value). The HMI 230 may be a touch panel display that functions as both the input device and the notification device.

The perception sensor 260 includes various sensors that acquire information for perceiving the external environment of the vehicle 1 (hereinafter also referred to as "environmental information"). The perception sensor 260 acquires the environmental information of the vehicle 1 and outputs the environmental information to the computer 210. The environmental information is used for the autonomous driving control. In the present embodiment, the perception sensor 260 includes a camera that captures an image of the surroundings of the vehicle 1 (including the areas in front of and behind the vehicle 1), and an obstacle detector that detects obstacles with electromagnetic waves or sound waves. For example, the computer 210 can perceive persons, objects (other vehicles, poles, guardrails, etc.), and road line markings (e.g., center lines) that are located within the range perceivable from the vehicle 1 by using the environmental information received from the perception sensor 260. Artificial intelligence (AI) or an image processor may be used for the perception.

The attitude sensor 270 acquires information related to the attitude of the vehicle 1 (hereinafter also referred to as "attitude information") and outputs the information to the computer 210. The attitude sensor 270 includes various sensors that detect the acceleration, angular velocity, and location of the vehicle 1. In the present embodiment, the attitude sensor 270 includes an inertial measurement unit (IMU) and a positioning sensor. The IMU detects the longitudinal, lateral, and vertical accelerations of the vehicle 1 and the roll, pitch, and yaw angular velocities of the vehicle 1. The positioning sensor detects the location of the vehicle 1 using, for example, a positioning system such as a Global Positioning System (GPS). In the fields of motor vehicles and aircraft, there is known a technology for measuring the attitude with high accuracy by combining an IMU and a positioning sensor. For example, the computer 210 may measure the attitude of the vehicle 1 based on the attitude information by using such a known technology.

The sensor cleaner 290 is a device that removes dirt from a sensor exposed to air outside the vehicle 1 (e.g., the perception sensor 260). For example, the sensor cleaner 290 may clean a lens of the camera and an emission port of the obstacle detector with a cleaning solution and a wiper.

Predetermined functions of the vehicle 1 (e.g., braking, steering, and vehicle locking) are made redundant in order to improve safety. The control system of the base vehicle 100 includes a plurality of systems that implements equivalent functions. Specifically, the brake system 121 includes brake systems 121A, 121B. The steering system 122 includes steering systems 122A, 122B. The powertrain system 123 includes an EPB system 123A and a P-lock system 123B. Each system includes an ECU. Even if an abnormality occurs in one of the systems that implement equivalent functions, the other system operates normally, so that the function is performed properly in the vehicle 1.

The VCIB 111 includes a VCIB 111A and a VCIB 111B. Each of the VCIBs 111A, 111B includes a computer. The arithmetic modules 210A, 210B of the computer 210 are configured to communicate with the computers of the VCIBs 111A, 111B, respectively. The VCIB 111A and the VCIB 111B are connected to communicate with each other. The VCIBs 111A, 111B can operate independently. Even if an abnormality occurs in one of the VCIBs 111A, 111B, the other VCIB operates normally, so that the VCIB 111 operates normally. Both of the VCIBs 111A, 111B are connected to the systems via the integrated control manager 115. As shown in FIG. 2, the systems to which the VCIB 111A is connected are different in part from the systems to which the VCIB 111B is connected.

In the present embodiment, the function to accelerate the vehicle 1 is not redundant. The powertrain system 123 includes a propulsion system 123C as a system for accelerating the vehicle 1.

Figure 3:
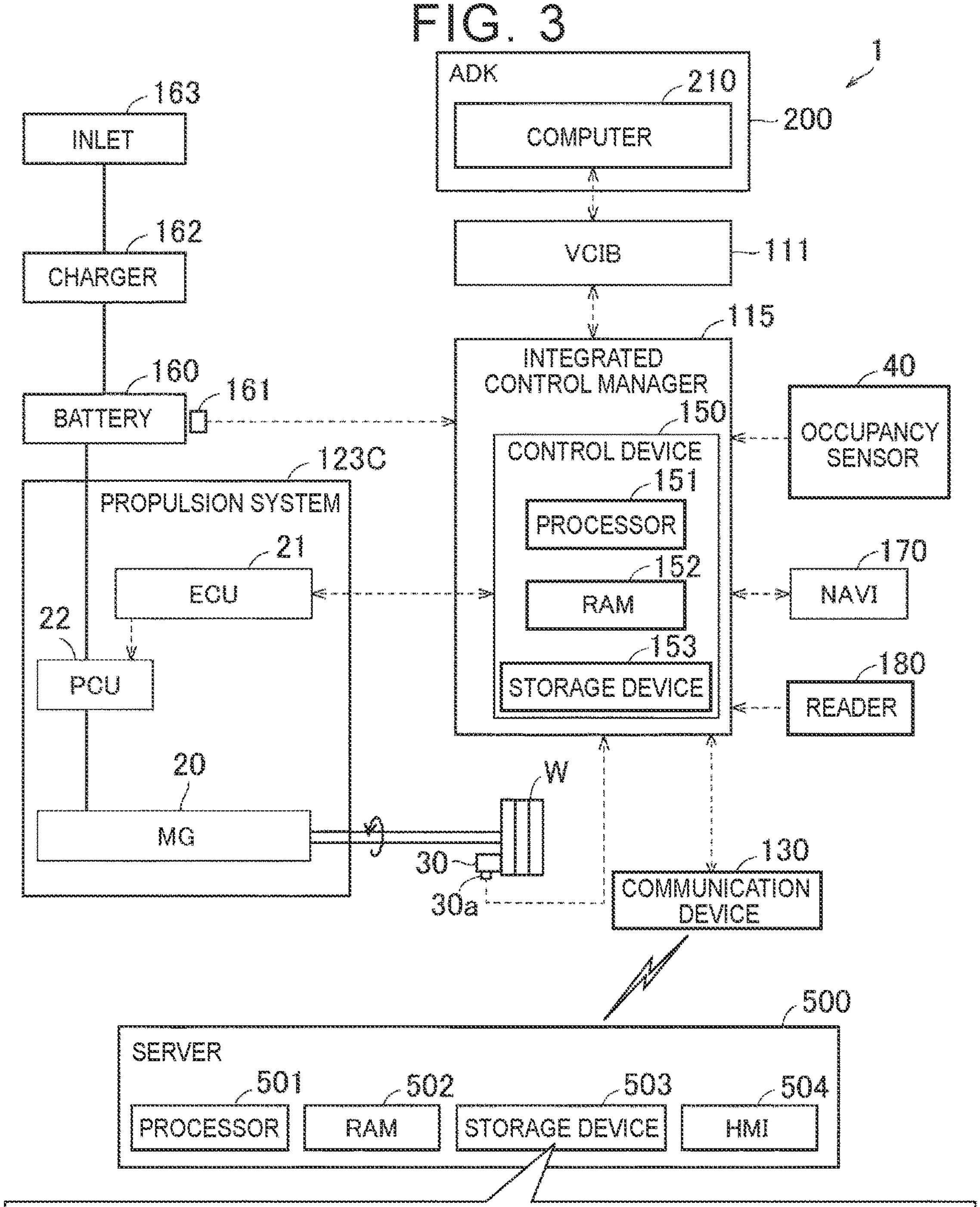
FIG. 3 illustrates an operation plan held by a server in an operation system according to the embodiment of the present disclosure.

FIG. 3 illustrates the configuration of the propulsion system 123C of the vehicle 1 and an example of an operation plan held by the server 500. Referring to FIG. 3 together with FIGS. 1 and 2, the vehicle 1 includes a motor generator (MG) 20, an ECU 21, a power control unit (PCU) 22, a braking device 30, a brake sensor 30*a*, an occupancy sensor 40, a battery 160, a battery management system (BMS) 161, a charger 162, an inlet 163, a navigation system (NAVI) 170, a reader 180, and a drive wheel W. The MG 20, the ECU 21, and the PCU 22 are included in the propulsion system 123C. The braking device 30 and the brake sensor 30*a* are included in the brake system 121 (FIG. 1).

The battery 160 supplies power to the propulsion system 123C. The battery 160 can be a known energy storage device for vehicles (e.g., liquid secondary battery, all-solid-state secondary battery, or assembled battery). Examples of a secondary battery for vehicles include a lithium-ion battery and a nickel metal hydride battery.

The battery 160 is provided with the BMS 161. The BMS 161 includes various sensors that detect the state of the battery 160 (e.g., voltage, current, and temperature). The BMS 161 outputs the detection results to the integrated control manager 115. The control device 150 can acquire the state of the battery 160 (e.g., temperature, current, voltage, and state of charge (SOC)) based on an output signal from the BMS 161. The SOC indicates the remaining capacity of the battery. For example, the SOC is the ratio of the available capacity to the capacity in the fully charged state and varies between 0% and 100%.

The vehicle 1 is configured to perform charging with power supplied from outside the vehicle (external power supply) (hereinafter also referred to as "external charging"). The external charging that is performed by the vehicle 1 is contact charging (plug-in charging) with power supplied from electric vehicle supply equipment (EVSE). The inlet 163 is configured to be connectable to a connector of a charging cable for EVSE (external power supply). The charger 162 converts power supplied from outside the vehicle 1 to the inlet 163 to power suitable for charging the battery 160. The charger 162 is, for example, an in-vehicle charger that includes either or both of a direct current-to-direct current (DC/DC) converter and an inverter. The external charging is not limited to the plug-in charging, and may be contactless charging.

The propulsion system 123C generates a traction force for the vehicle 1 by using the power stored in the battery 160. The MG 20 is, for example, a three-phase alternating current (AC) motor generator. The PCU 22 includes, for example, an inverter, a converter, and a relay. The PCU 22 is controlled by the ECU 21. The relay is configured to connect and disconnect the electric circuit from the battery 160 to the MG 20. The relay is closed (connected) when the vehicle 1 is traveling.

The MG 20 is driven by the PCU 22 and rotates the drive wheel W of the vehicle 1. The MG 20 generates regenerative power and supplies the generated power to the battery 160. The PCU 22 drives the MG 20 with the power supplied from the battery 160. The vehicle 1 may include any number of traction motors (MGs 20). The vehicle 1 may include one traction motor, two traction motors, or three or more traction motors. The traction motor may be an in-wheel motor. Although only one drive wheel W is schematically shown in FIG. 3, the vehicle 1 may include any number of drive wheels W and may be equipped with any drive system. The drive system of the vehicle 1 may be front-wheel drive, rear-wheel drive, or four-wheel drive.

Each wheel (including the drive wheel W) of the vehicle 1 is provided with the braking device 30 and the brake sensor 30*a*. The brake sensor 30*a* detects the braking force applied to the wheel by the braking device 30. The brake sensor 30*a* may be an oil pressure sensor that detects the oil pressure applied to a brake pad (or wheel cylinder). The braking forces on the wheels detected by the four brake sensors 30*a* are output to the integrated control manager 115.

The occupancy sensor 40 is configured to detect whether a person (e.g., a passenger) is in the vehicle 1. More specifically, the occupancy sensor 40 acquires information for perceiving the environment in the cabin of the vehicle 1 and outputs the acquired information to the integrated control manager 115. The occupancy sensor 40 includes, for example, either or both of a camera and an infrared sensor that face inside the cabin of the vehicle 1. The occupancy sensor 40 may further include either or both of a seat occupancy sensor and a seat belt sensor. The control device 150 can determine whether the vehicle 1 is occupied based on the output from the occupancy sensor 40.

The NAVI 170 includes a touch panel display, a positioning sensor, and a storage device (none of which shown). The storage device stores map information. The NAVI 170 is configured to display the real-time location of the vehicle 1 on a map. The NAVI 170 is configured to perform a route search for finding an optimal route (e.g., the shortest route) from the current location of the vehicle 1 to a destination by referring to the map information. The NAVI 170 may update the map information via OTA as needed.

The reader 180 is configured to read predetermined identification information from an image. More specifically, the reader 180 captures an image, extracts a predetermined code from the image, and performs a decoding process. The code extracted from the image is converted to predetermined identification information by the decoding process. The reader 180 then outputs the identification information read from the image to the integrated control manager 115. The reading method of the reader 180 is not limited to the above method, and the reader 180 may use any reading method. For example, the reader 180 may be a radio frequency identification (RFID) reader. The reader 180 may be provided so that a user outside the vehicle 1 can use it.

The vehicle 1 according to the present embodiment is an autonomous vehicle. The vehicle 1 provides a service by driverless autonomous driving. That is, there is no one in the vehicle 1 who manages the vehicle 1. Basically, only service users are in the vehicle 1. When all the service users leave the vehicle 1, the vehicle 1 becomes unoccupied.

The server 500 can identify users who are using the vehicle 1 based on information from the vehicle 1. The server 500 manages information regarding each user registered with the storage device 503 (user information). Identification information for identifying a user (user ID) is assigned to each user, and the server 500 manages the user information by associating the user information with the user ID. In the present embodiment, each user registered with the server 500 carries mobile equipment UT. The user information includes personal information (name, address, age, service usage history, etc.) and the address of the mobile equipment UT carried by the user. The server 500 may manage service usage fees for each user.

Application software (hereinafter referred to as "mobile app") for using a transport service provided by the server 500 is installed on the mobile equipment UT. When the mobile equipment UT requests a task (transport) to the server 500 and receives a reply of approval from the server 500 (e.g., see S103 in FIGS. 5 and 9 described later), the mobile equipment UT is allowed to display a code issued by the server 500. When the user holds the mobile equipment UT displaying the code over the reader 180 of the vehicle 1, the control device 150 identifies the user based on the information from the mobile equipment UT, and performs a process for executing the requested task (transport) (e.g., control for opening and closing a door of the vehicle 1 and travel control according to an operation plan).

An operation system according to the present embodiment includes the server 500 and a plurality of vehicles 1 having the configuration shown in FIGS. 1 to 3. The vehicles 1 are registered with the server 500. Each vehicle registered with the server 500 may function as a robotaxi vehicle. The server 500 generates an operation plan for each of the vehicles 1 and stores the generated operation plan in the storage device 503. Identification information for identifying a vehicle (vehicle ID) is assigned to each vehicle, and the server 500 manages information regarding each vehicle (including the operation plan) by associating the information regarding each vehicle with the vehicle ID. The server 500 instructs each of the vehicles 1 to operate according to the operation plan stored in the storage device 503.

The operation plan stored in the storage device 503 includes: the type of task (e.g., transport of people or transport of goods); task start information indicating a task start point and time; task end information indicating a task end point and time; pre-task movement information indicating a route and travel conditions for the vehicle to travel to the task start point before starting the task; and task execution movement information indicating a route and travel conditions for the vehicle to move from the task start point to the task end point while executing the task; and replenishment information indicating a plan regarding energy replenishment for operation. The replenishment information indicates an energy replenishment point and a period of stay. The energy replenishment point is a location where the vehicle is replenished with energy, and the period of stay is a period during which the vehicle stays at the energy replenishment point. For those vehicles that are predicted to have enough energy left after finishing the task, the replenishment information may indicate that no energy replenishment point and period of stay are set, namely may indicate that the vehicle will not be replenished with energy after finishing the task. An operation plan with a plurality of tasks includes, for each task, the type of task, pre-task movement information, task start information, task execution movement information, task end information, and replenishment information, and is stored in the storage device 503 in such a manner that these pieces of information are associated with each task.

The initial operation plan of the vehicles includes only non-operating sections. When a task requested by a user (service user) is assigned to a vehicle, an operating section is added to the operation plan for that vehicle (see FIGS. 5 and 9 described later). In the present embodiment, the operating section is a section in the operation plan where the vehicle is executing a task (see FIG. 7 described later). The non-operating section is a section in the operation plan that is not an operating section (see FIG. 7 described later).

The storage device 503 further stores information indicating the current status of each vehicle registered with the server 500 (e.g., location, vehicle speed, remaining amount of energy, and presence or absence of passengers). The server 500 receives, from each registered vehicle, information indicating the current status of the vehicle (e.g., detection results from various in-vehicle sensors) as needed. The storage device 503 may further store specification information of each vehicle registered with the server 500. In the present embodiment, the vehicles registered with the server 500 are the vehicles 1 having the configuration described above (see FIGS. 1 to 3).

Figure 4:
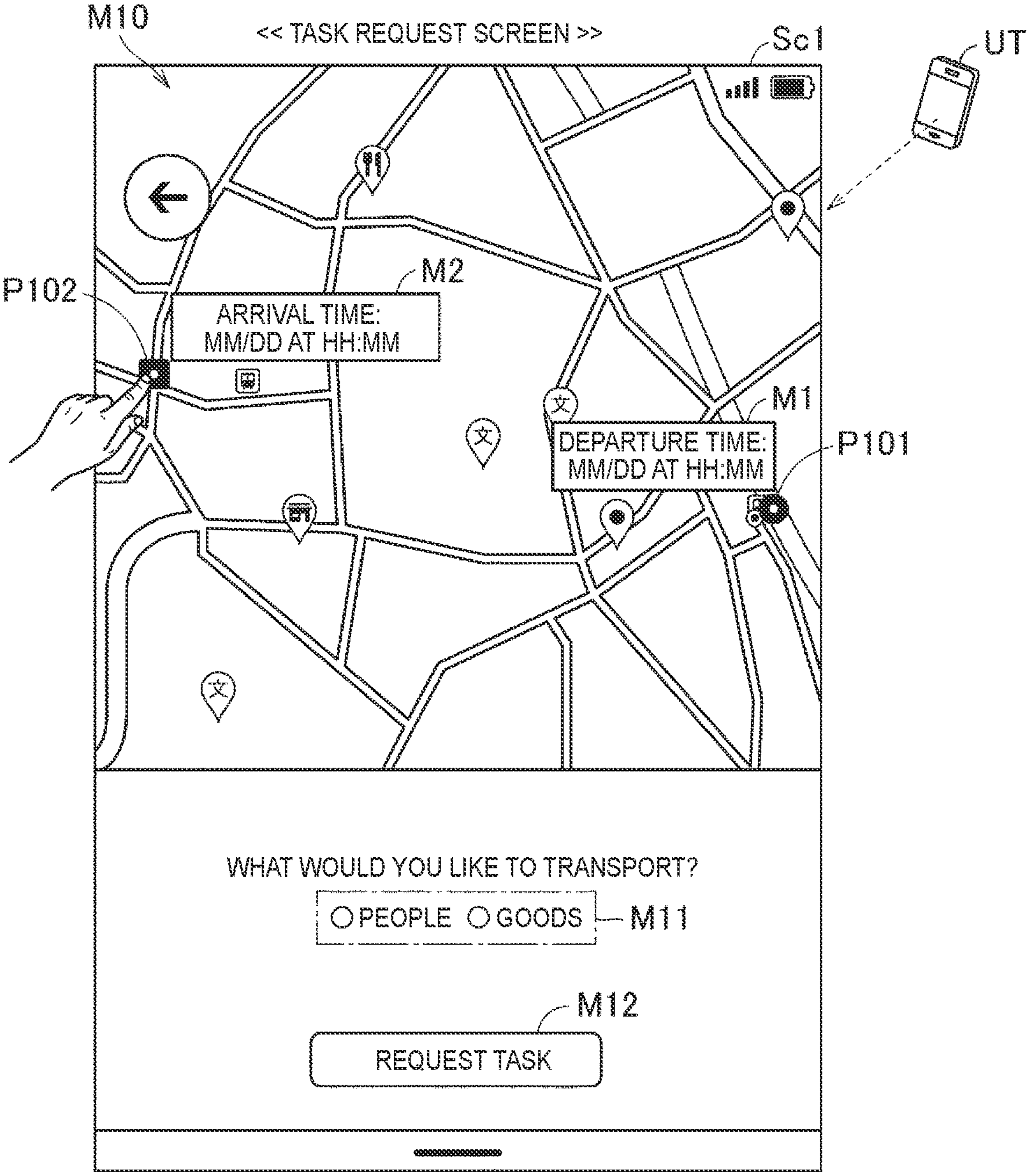
FIG. 4 shows a task request screen used in the operation system according to the embodiment of the present disclosure.

The server 500 receives task requests from user equipment (e.g., the mobile equipment UT). FIG. 4 shows an example of a screen for a user to request a task (transport) to the server 500 (task request screen). Referring to FIG. 4, a screen Sc1 is displayed on, for example, the touch panel display of the mobile equipment UT. The screen Sc1 includes: a map M10 (map); a display section P101 (e.g., an icon) showing a task start point; a display section M1 (e.g., a text box) showing a task start date and time; a display section P102 (e.g., an icon) showing a task end point; a display section M2 (e.g., a text box) showing a task end date and time; an operation section M11 (e.g., a check box or a radio button) for the user to input the type of task; and an operation section M12 (e.g., a button) for the user to request a task to the server 500.

The user can cause a desired map M10 to be displayed on the mobile equipment UT by operating (e.g., scrolling) the touch panel. The user can also reduce or enlarge the map M10 by operating (e.g., pinching in or out) the touch panel. The user can designate any position on the map M10 by tapping the displayed map M10. The user can designate a task start point and a task end point by operating (tapping) the touch panel in this manner. The display sections P101, P102 show the task start point and task end point designated by the user on the map M10, respectively. The user can input a task start date and time and a task end date and time to the mobile equipment UT by operating the touch panel (e.g., operating a touch keyboard) or by voice input. The display sections M1, M2 show the task start date and time and task end date and time input by the user, respectively. The operation section M11 receives, for example, input of an object to be transported (people or goods). When the user operates the operation section M12, the mobile equipment UT requests the task specified by the display sections P101, P102, M1, and M2 and the operation section M11 to the server 500. Specifically, the mobile equipment UT sends a first task request signal to the server 500. The first task request signal indicates the user ID, the type of task input via the operation section M11 (e.g., transport of people or goods), task start information shown on the display sections P101, M1, and task end information shown on the display sections P102, M2.

The screen Sc1 shown in FIG. 4 can be changed as appropriate. For example, the operation section M11 may further receive input of the task amount (e.g., the number of people or the amount of goods). The first task request signal may further indicate the task amount.

Figure 5:
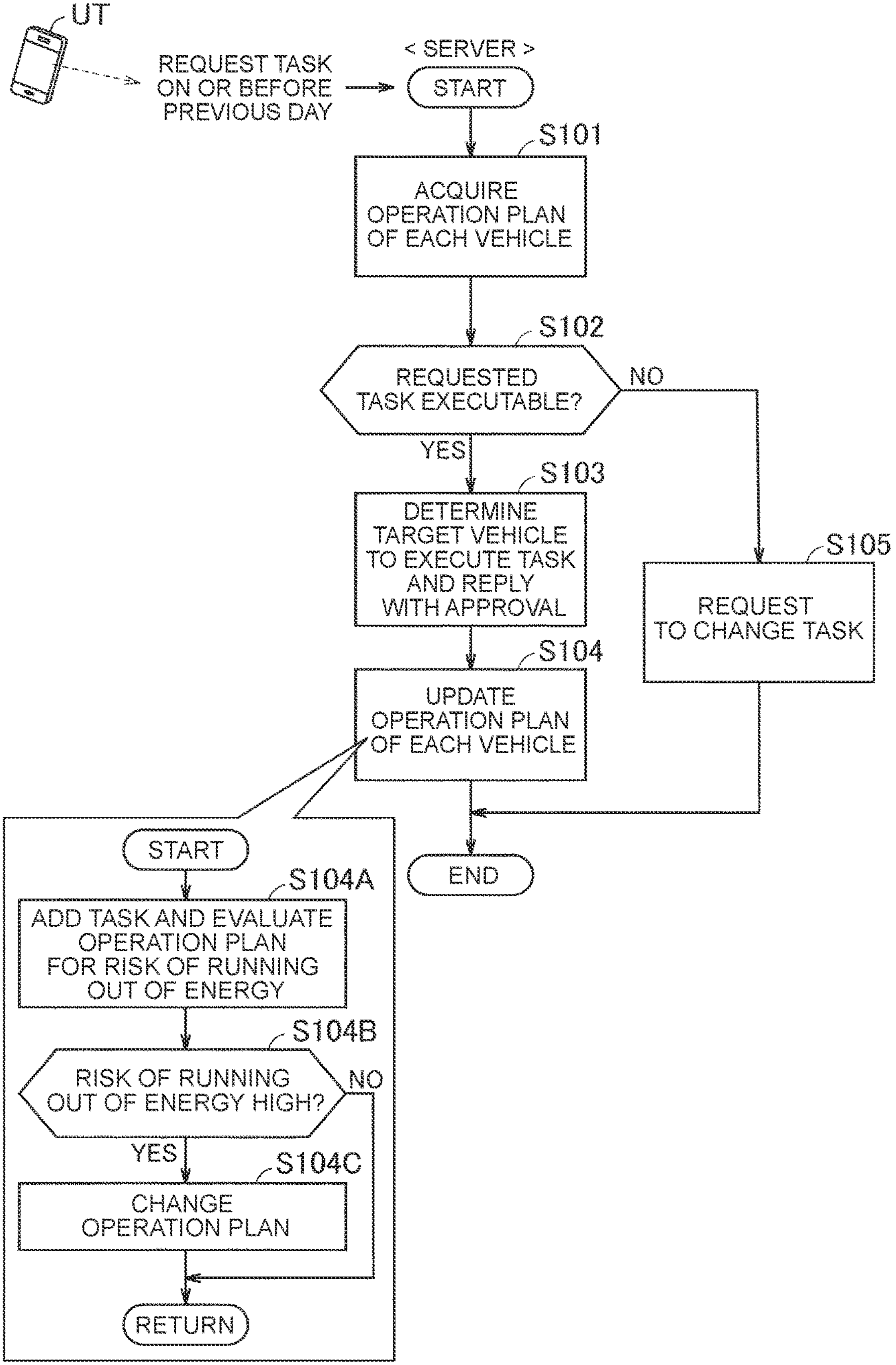
FIG. 5 is a flowchart of a process related to task scheduling in an operation method according to the embodiment of the present disclosure.

The user can schedule a task on the server 500 by requesting the task to the server 500 using the mobile equipment UT on or before the day before the operation plan is to be executed. In the example shown in FIG. 4, the task start date shown on the display section M1 is to the day the operation plan is to be executed. The server 500 receives task requests from each of the registered users. Each user requests a task using the mobile equipment UT (see FIG. 4). When the server 500 receives a first task request signal from mobile equipment UT, the server 500 performs a series of steps shown in FIG. 5, described below, for the user associated with that mobile equipment UT. Every time the server 500 receives a task request from any one of the registered users, the server 500 performs the series of steps shown in FIG. 5 for that user. FIG. 5 is a flowchart of a process related to task scheduling. The letter "S" in the flowchart means a step.

Referring to FIG. 5 together with FIGS. 1 to 3, the server 500 acquires the operation plan of the registered vehicles in S101. Specifically, the processor 501 reads the operation plan of the registered vehicles from the storage device 503. The server 500 then determines in S102 whether the task requested by the first task request signal is executable by any of the vehicles, based on the operation plan of the registered vehicles and the content of the task indicated by the first task request signal (e.g., task start information and task end information). For example, the server 500 checks the operation plan of the registered vehicles. When there is any vehicle available for the operating section for executing the requested task, the server 500 determines that the requested task is executable. When no vehicle is available for the operating section for executing the requested task, the server 500 determines that the requested task is not executable. The server 500 may also determine whether that vehicle can execute the requested task based on the location and state (e.g., remaining amount of energy) of the vehicle at the task start time in addition to the operation plan of the vehicle. The server 500 may predict the location and state of the vehicle at the task start time based on the travel history of the vehicle and the operation plan of the vehicle.

When it is determined that none of the vehicles can execute the requested task (NO in S102), the server 500 requests the mobile equipment UT (terminal of the user who requested the task) to change the task in S105. The series of steps shown in FIG. 5 ends after S105. The user requested to change the task may cause the mobile equipment UT to display, for example, the screen Sc1 shown in FIG. 4, change the content of the task by operating the mobile equipment UT, and send the changed task to the server 500. In response to this request, the server 500 starts the series of steps shown in FIG. 5 again.

When it is determined that one of the vehicles can execute the requested task (YES in S102), the server 500 determines the vehicle to execute the requested task (hereinafter also referred to as "target vehicle") from the registered vehicles 1 and returns an approval signal indicating that the requested task is going to be executed to the mobile equipment UT (equipment of the user who requested the task) in S103.

The server 500 determines the vehicle available for the operating section for executing the requested task to be the target vehicle, based on the operation plan of the registered vehicles. When two or more of the vehicles can execute the requested task, the server 500 may select the vehicle suitable for the requested task based on at least one of the following: performance of the vehicle, location of the vehicle at the task start time, and state of the vehicle (e.g., remaining amount of energy) at the task start time.

After S103, the process proceeds to S104. In S104, the server 500 determines the operation plan for the target vehicle and updates the operation plan of the registered vehicles. Specifically, in S104, the server 500 performs, for example, S104A to S104C shown in FIG. 5. In S104A, the server 500 adds the operating section for executing the requested task to the operation plan of the target vehicle to which the task is assigned so that the target vehicle does not conflict with any other vehicles. The server 500 evaluates the operation plan of the target vehicle to which the operating section has been added for the risk of running out of energy. The risk of running out of energy regarding the operation plan of the target vehicle refers to the possibility (e.g., probability) of the target vehicle running out of energy (e.g., electricity) during execution of the operation plan. In S104B, the server 500 determines, based on the result of the above evaluation, whether the risk of running out of energy regarding the operation plan of the target vehicle is higher than a predetermined reference level. For example, the server 500 predicts changes in remaining amount of energy of the target vehicle for the entire operation period. When the remaining amount of energy in the target vehicle will fall even temporarily below a predetermined energy lower limit value during the operation period, the server 500 determines that the risk of running out of energy is higher than the reference level. When the remaining amount of energy in the target vehicle will be equal to or greater than the energy lower limit value during the entire operation period, the server 500 determines that the risk of running out of energy is lower than the reference level. The remaining amount of energy in the vehicle 1 is represented by, for example, the SOC of the battery 160. When the risk of running out of energy regarding the operation plan of the target vehicle is higher than the reference level (YES in S104B), the server 500 further adds an energy replenishment point and a period of stay at the energy replenishment point before the start of the task or after the end of the task in the operation plan of the target vehicle in S104C. At this time, the server 500 sets the energy replenishment point and the period of stay so that no conflict will occur at any replenishment point. A conflict at a replenishment point is an event in which two or more vehicles are replenished with energy at the same location at the same time. When the risk of running out of energy regarding the operation plan of the target vehicle is lower than the reference level (NO in S104B), no energy replenishment point is added to the operation plan of the target vehicle.

In S104, the server 500 may determine the operation plan for the target vehicle so that the target vehicle executes the task in compliance with traffic laws and regulations, conflicts at replenishment points are avoided, and the risk of the target vehicle running out of energy is lower than the reference level. The operation plan determined in S104 is stored in the storage device 503. However, the operation plan determined at this time may be changed before an operation instruction is given (see S14 in FIG. 6 described later).

The task is scheduled on the server 500 by step S104. When a predetermined time of the scheduled day (day the operation plan is to be executed) comes, the server 500 with the task scheduled performs a series of steps shown in FIG. 6 described below. The predetermined time may be a predetermined start time (e.g., 5 a.m.). Alternatively, the server 500 may determine the predetermined time based on the operation plan of the vehicles so that the earliest scheduled task can be executed.

Figure 6:
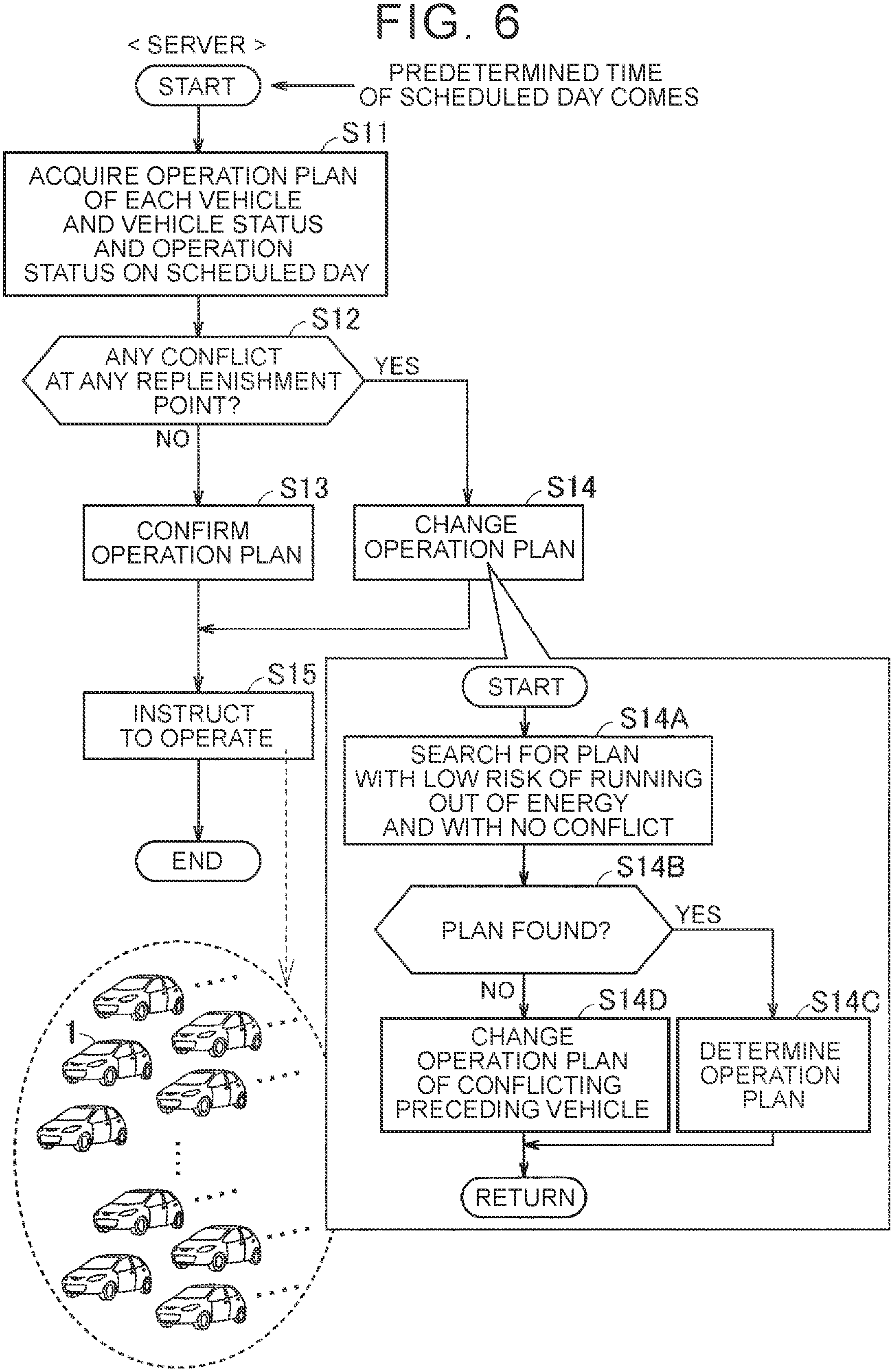
FIG. 6 is a flowchart of a process for executing tasks according to a scheduled operation plan in the operation method according to the embodiment of the present disclosure.

FIG. 6 is a flowchart of a process for executing tasks according to a scheduled operation plan. Referring to FIG. 6 together with FIGS. 1 to 3, in S11, the server 500 acquires the operation plan of the registered vehicles (see FIG. 3), vehicle information indicating the current status of each registered vehicle, and operation information indicating the predicted operation status for the scheduled day (latest prediction information at this point). The vehicle information may indicate the current location of the vehicle and the remaining amount of energy in the vehicle. The operation information may indicate the traffic congestion conditions on each road and the weather conditions (e.g., sunny, cloudy, rainy, or snowy, and temperature).

In S12, the server 500 determines, based on the operation plan, vehicle information, and operation information acquired in S11, whether any conflict will occur at any replenishment point if the vehicles registered with the server 500 are instructed to operate according to this operation plan.

When it is determined that no such conflict will occur in the operation plan acquired in S11 (that is, the operation plan of the registered vehicles stored in the storage device 503 at the start of the series of steps shown in FIG. 6) (NO in S12), the server 500 determines not to change this operation plan in S13 (confirms the operation plan). The operation plan is determined for each target vehicle to which a task(s) has been assigned (see FIG. 5).

When it is determined that such a conflict will occur in the operation plan acquired in S11 (YES in S12), the server 500 changes, in S14, the operation plan of at least one of the conflicting target vehicles so that the conflict is avoided. Since it is unlikely that three or more target vehicles conflict at one energy replenishment point, the following description will be given for the case where two target vehicles will conflict at one energy replenishment point. In the following description, of the two conflicting target vehicles, the vehicle that is predicted to arrive at the energy replenishment point first based on the operation plan is referred to as "preceding vehicle," and the vehicle that is predicted to arrive at the energy replenishment point later based on the operation plan is referred to as "following vehicle." If the preceding vehicle and the following vehicle move as planned in their operation plan, the following vehicle will arrive at the energy replenishment point while the preceding vehicle is staying at the energy replenishment point.

In S14, the server 500 performs, for example, S14A to S14D in FIG. 6. In S14A, the server 500 searches for an operation plan for the following vehicle that satisfies all of the following requirements: the risk of running out of energy is lower than a predetermined reference level (first requirement), the conflict can be avoided (second requirement), and the assigned task(s) can be executed (third requirement). In S14B, the server 500 determines whether an operation plan for the following vehicle that satisfies all of the first to third requirements is found. The reference level used in S14A may be the same as or different from the reference level used in S104B of FIG. 5. The server 500 may determine whether the operation plan of the following vehicle will satisfy all of the first to third requirements if either or both of the route and the travel conditions in the operation plan of the following vehicle are changed. For example, the server 500 may avoid the conflict by changing the route of the following vehicle so that the following vehicle will be replenished with energy at a different energy replenishment point from the one where the conflict will occur (that is, by changing the energy replenishment point of the following vehicle). Alternatively, the server 500 may avoid the conflict by changing the travel conditions or route of the following vehicle so that the following vehicle will arrive at the energy replenishment point after the preceding vehicle completes energy replenishment at that energy replenishment point. For the operation plan of the following vehicle, the arrival time of the following vehicle at the energy replenishment point can be delayed by reducing the vehicle speed, causing the following vehicle to stop along the route, or changing the route to a detour or a loop route.

When an operation plan for the following vehicle that satisfies all of the first to third requirements is found (YES in S14B), the server 500 determines that operation plan to be the operation plan for the following vehicle in S14C. The operation plan thus determined is stored in the storage device 503 as an operation plan of the following vehicle (see FIG. 3). When two or more operation plans for the following vehicle that satisfy all of the first to third requirements are found, the server 500 selects, for example, the operation plan with the lowest risk of running out of energy from these operation plans. That is, the server 500 selects the operation plan with the lowest risk of the following vehicle running out of energy out of the operation plans for the following vehicle.

However, the present disclosure is not limited to this. When two or more operation plans for the following vehicle that satisfy all of the first to third requirements are found, the server 500 may select the operation plan with the highest energy efficiency from these operation plans. The server 500 may calculate the energy efficiency of each operation plan by using the travel conditions (vehicle speed, travel time, etc.) and route (travel distance, elevation difference, etc.) indicated by the operation plan. The server 500 may calculate the energy efficiency of each operation plan by additionally using either or both of the traffic congestion conditions and weather conditions on the day the operation plan is to be executed. For example, the longer the travel time, the greater the energy consumption. When an autonomous vehicle is traveling, it consumes a large amount of energy by sensing for travel (operation of an autonomous driving system). The amount of energy consumption (electricity consumption) due to travel varies with the vehicle speed. Energy consumption due to friction and resistance during travel tends to be greater at high speeds than at low speeds.

Energy consumption per unit time due to sensing (operation of the autonomous driving system) also tends to be greater at high speeds than at low speeds. This is because the higher the speed, the farther the vehicle needs to sense. However, the travel time (time it takes to reach the destination) is longer at low speeds than at high speeds. The longer the travel time, the greater the energy consumption due to sensing.

When an operation plan for the following vehicle that satisfies all of the first to third requirements is not found (NO in S14B), the server 500 changes in S14D the operation plan of the preceding vehicle so that the conflict is avoided.

For example, when the remaining amount of energy in the preceding vehicle at the conflict occurrence time predicted from the operation plan of the vehicles is less than a predetermined reference amount, the server 500 changes both the operation plan of the preceding vehicle and the operation plan of the following vehicle. Specifically, the server 500 changes the operation plan of the preceding vehicle and the operation plan of the following vehicle so that the preceding vehicle departs from the energy replenishment point and the following vehicle arrives at that energy replenishment point at the timing when the remaining amount of energy in the preceding vehicle reaches the predetermined reference amount by energy replenishment (charging). In this case, the server 500 advances the departure time (end of the period of stay) of the preceding vehicle and delays the arrival time (start of the period of stay) of the following vehicle for this energy replenishment point. The server 500 may set the reference amount based on the operation plan of the preceding vehicle so that the preceding vehicle can perform the assigned task(s).

When the remaining amount of energy in the preceding vehicle at the conflict occurrence time predicted from the operation plan of the vehicles is greater than the predetermined reference amount, the server 500 changes the period of stay of the preceding vehicle at the energy replenishment point so that the preceding vehicle departs from this energy replenishment point at the conflict occurrence time. In this case, the server 500 advances the departure time (end of the period of stay) of the preceding vehicle but does not change the period of stay of the following vehicle for this energy replenishment point.

When three or more vehicles conflict at one energy replenishment point, the server 500 may search for an operation plan that satisfies all of the first to third requirements for each of the conflicting vehicles. The server 500 may raise the reference level of the first requirement when no such operation plan is found. The lower the energy lower limit value, the higher the reference level of the first requirement becomes.

When the operation plan of each target vehicle is confirmed in S13 or S14, the server 500 instructs each target vehicle to operate according to the operation plan in S15. In response to an instruction from the server 500, each target vehicle operates according to the operation plan by autonomous driving. The requested task is thus executed. As described above, the server 500 is configured to generate an operation plan for each of the vehicles 1 and instruct each of the vehicles 1 to operate according to the generated operation plan.

Figure 7:
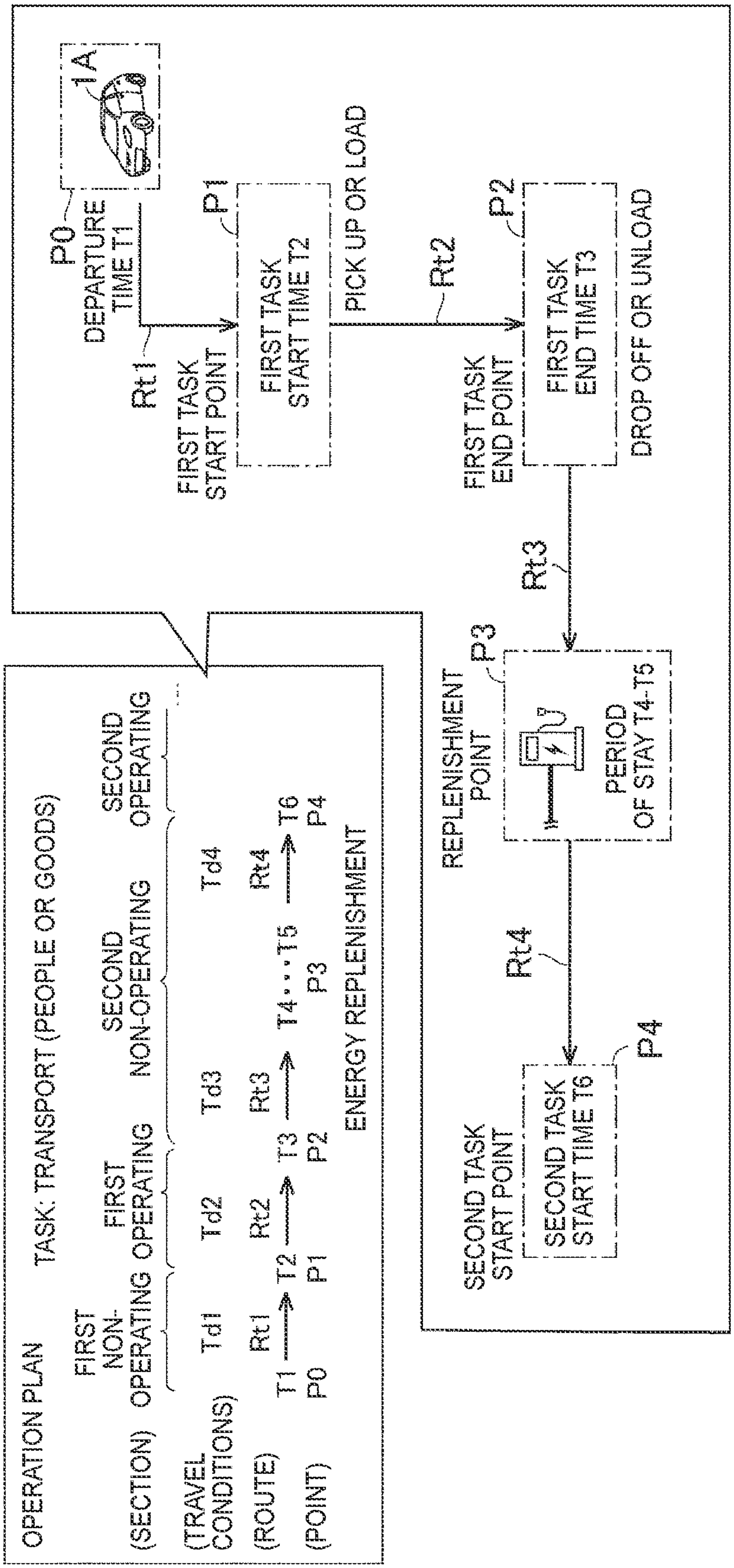
FIG. 7 illustrates a specific example of a vehicle operation plan that can be used in the operation system according to the embodiment of the present disclosure.

FIG. 7 illustrates an example of an operation plan of a vehicle 1A. The vehicle 1A is a target vehicle. The operation plan shown in FIG. 7 includes a start position P0, a departure time T1 from the start position P0, a start point P1 of a first task (hereinafter also referred to as "first task start point P1"), a start time T2 of the first task (hereinafter also referred to as "first task start time T2"), an end point P2 of the first task (hereinafter also referred to as "first task end point P2"), an end time T3 of the first task (hereinafter also referred to as "first task end time T3"), a replenishment point P3, a period of stay at the replenishment point P3 (time T4 to time T5), a start point P4 of a second task (hereinafter also referred to as "second task start point P4"), and a start time T6 of the second task (hereinafter also referred to as "second task start time T6").

In the example shown in FIG. 7, the location of the vehicle 1A at the time of starting the operation plan is the start position P0. When the type of the requested first task is transport of people, the location and time of pick-up by the vehicle 1A are the start point P1 and the start time T2, and the location and time of drop-off from the vehicle 1A are the end point P2 and the end time T3. When the type of the requested first task is transport of goods, the location and time of loading onto the vehicle 1A are the start point P1 and the start time T2, and the location and time of unloading from the vehicle 1A are the end point P2 and the end time T3. The type, start point P1, end point P2, start time T2, and end time T3 of the first task are specified by the first task request signal (see FIG. 4). The server 500 may set the start time T2 and the end time T3 earlier than the scheduled departure times of the vehicle 1A from the start point P1 and the end point P2 by a predetermined amount of time (predicted required time), respectively, in consideration of the time required for pick-up/loading and drop-off/unloading (required time).

The replenishment point P3 is a location where the vehicle 1A is replenished with energy for the second task after executing the first task (energy replenish point). Energy replenishment for the vehicle 1A is, for example, plug-in charging of the battery 160. The period of stay at the replenishment point P3 is the period from the arrival time T4 of the vehicle 1A at the replenishment point P3 to the departure time T5 of the vehicle 1A from the replenishment point P3.

The operation plan shown in FIG. 7 further includes a route Rt1 (first route to the first task start point P1), travel conditions Td1 for the route Rt1 (first travel conditions), a route Rt2 (second route from the first task start point P1 to the first task end point P2), travel conditions Td2 for the route Rt2 (second travel conditions), a route Rt3 (third route from the first task end point P2 to the energy replenishment point P3), travel conditions Td3 for the third route Rt3 (third travel conditions), a route Rt4 (fourth route from the energy replenishment point P3 to the second task start point P4), and travel conditions for the route Rt4 (fourth travel conditions). The travel conditions include, for example, the vehicle speed. However, the travel conditions are not limited to the vehicle speed, and the travel conditions may indicate more detailed conditions regarding travel (number of stops, number of loops, etc.).

The above operation plan further includes a first non-operating section (section from the start position P0 to the first task start point P1), a first operating section (section from the first task start point P1 to the first task end point P2), and a second non-operating section (section from the first task end point P2 to the second task start point P4), and a second operating section (section from the second task start point P4 to a second task end point (end point of the second task)). Although the operation plan for executing the second task is not shown in FIG. 7, the operation plan for the second task after the first task is also set in the same manner as that for the first task described above.

Figure 8:
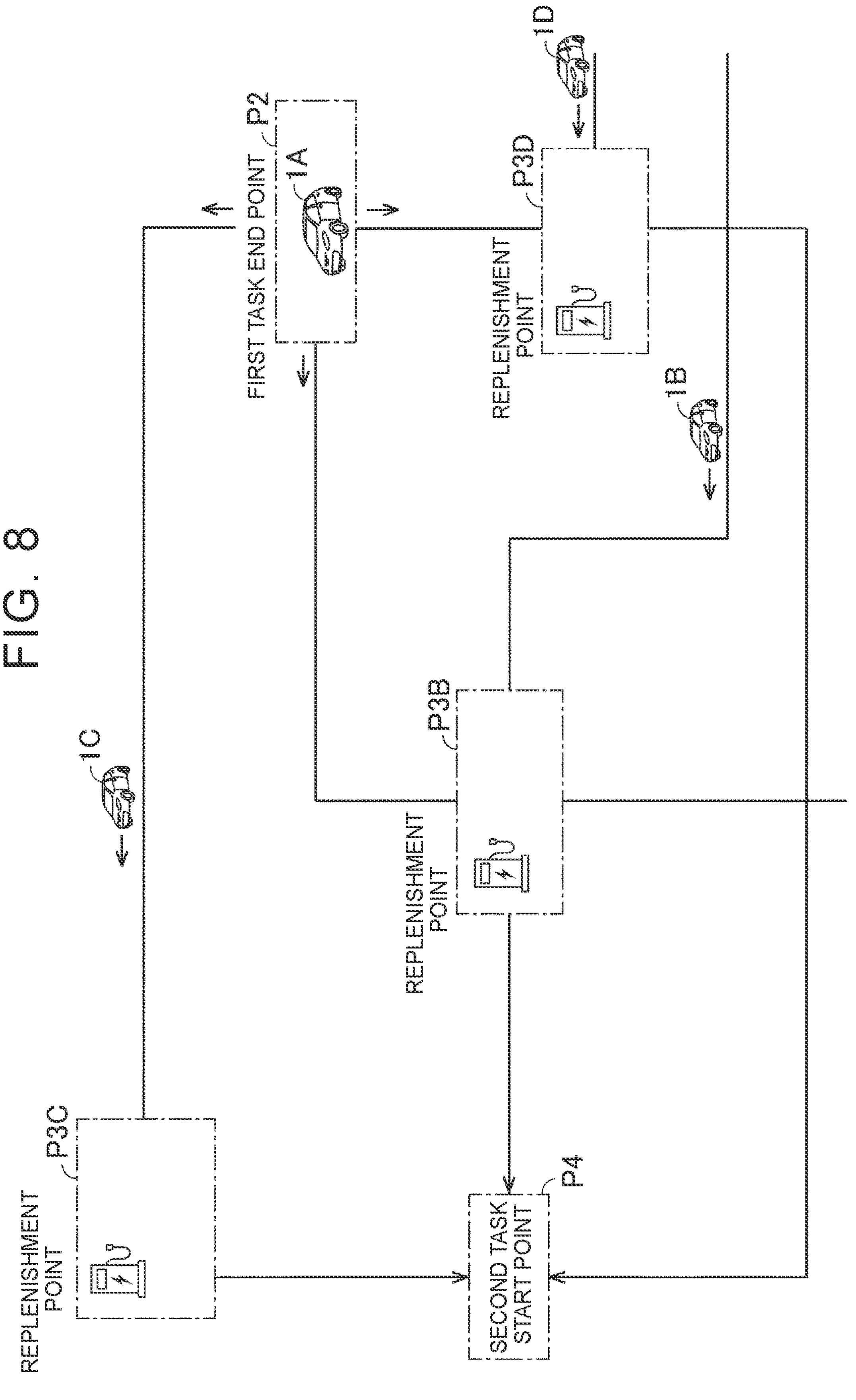
FIG. 8 illustrates a conflict avoidance method in the embodiment of the present disclosure.

FIG. 8 illustrates a conflict avoidance method in the present embodiment. When it is determined in S12 of FIG. 6 that the vehicle 1A will not conflict with any other vehicles in the operation plan of the vehicle 1A, this operation plan is confirmed in the subsequent step S13. When it is determined in S12 of FIG. 6 that the vehicle 1A will conflict with any of the other vehicles in the operation plan of the vehicle 1A, a search for an operation plan is made in the subsequent step S14A. The operation plan shown in FIG. 8 is an operation plan found by the search in S14A, namely an operation plan for the vehicle 1A that satisfies the first and third requirements. Specifically, the first and third requirements are satisfied by setting one of replenishment points P3B, P3C, and P3D as an energy replenishment point (corresponding to the replenishment point P3 shown in FIG. 7) in the operation plan of the vehicle 1A. When no conflict will occur at least one of the replenishment points P3B, P3C, and P3D, the second requirement is also satisfied. Therefore, the replenishment point where no conflict will occur is determined to be the energy replenishment point in S14C of FIG. 6. When there are two or more replenishment points where no conflict will occur, the server 500 selects one of these replenishment points according to selection criteria described later. Conflicts will be avoided by changing the energy replenishment point (changing the route).

When the server 500 determines based on the operation plan of vehicles 1A to 1D that the vehicle 1A will conflict with the vehicles 1B, 1C, and 1D (preceding vehicles) at replenishment points P3B, P3C, and P3D, respectively, the server 500 selects one of the replenishment points P3B, P3C, and P3D and changes the operation plan of the preceding vehicles so that the conflicts are avoided in S14D of FIG. 6. Conflicts will occur if the period of stay of the vehicle 1A at least partially overlaps the periods of stay of the vehicles 1B, 1C, and 1D at the replenishment points P3B, P3C, and P3D, respectively. The server 500 selects one of the replenishment points P3B, P3C, and P3D according to, for example, the selection criteria described below.

The selection criteria (rules for selecting a replenishment point) in the present embodiment will be described. When the risk of the vehicle 1A running out of energy is equal to or higher than a predetermined level, the server 500 may select such a replenishment point that the risk of the vehicle 1A running out of energy becomes the lowest. For example, the replenishment point P3D closest to the first task end point P2 may be selected. When the risk of the vehicle 1A running out of energy is less than the predetermined level and the remaining amounts of energy in the preceding vehicles at conflict occurrence times predicted from the operation plan of the vehicles are less than a predetermined amount, the server 500 may select such a replenishment point that the remaining amount of energy in the preceding vehicle at the predicted conflict occurrence time is the greatest. When the risk of the vehicle 1A running out of energy is less than the predetermined level and the remaining amounts of energy in the preceding vehicles at the conflict occurrence times predicted from the operation plan of the vehicles are equal to or greater than the predetermined amount, the server 500 may select such a replenishment point that the energy efficiency of the vehicle 1A becomes the highest. For example, the replenishment point P3B located on a route that requires the least energy consumption for the vehicle 1A to move from the first task end point P2 to the second task start point P4 may be selected.

Figure 9:
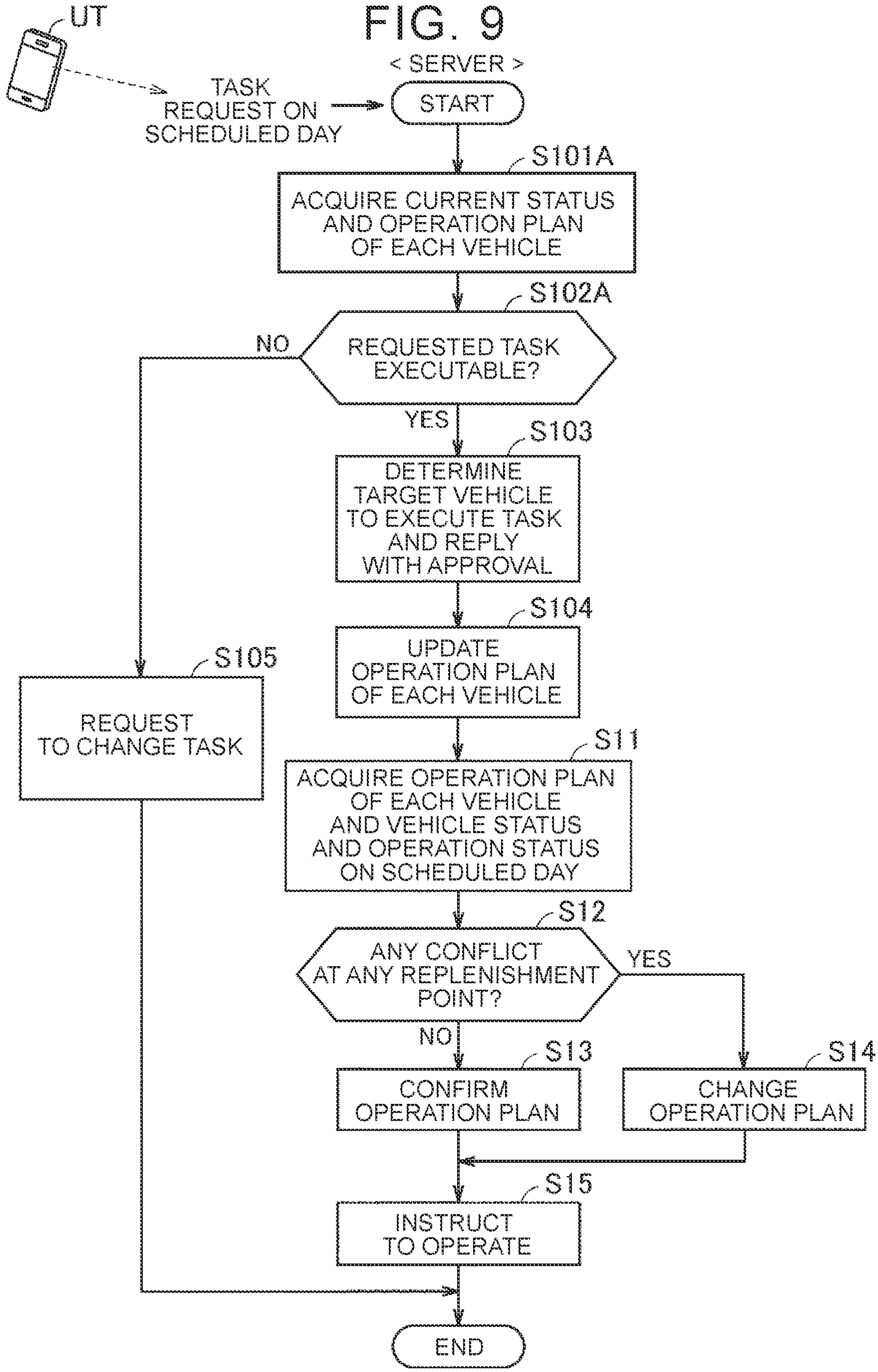
FIG. 9 is a flowchart of a process for executing tasks according to an operation plan requested on the scheduled day in the operation method according to the embodiment of the present disclosure.

FIG. 9 is a flowchart of a process for executing a task according to an operation plan requested on the day the task is to be executed. Specifically, the user can also request a task to the server 500 on the day the task is to be executed (scheduled day) by using the mobile equipment UT (see FIG. 4). When the user sets the task start date (display section M1) to today and operates the operation section M12 on the screen Sc1 shown in FIG. 4 to request a task to be started today to the server 500, the mobile equipment UT sends a second task request signal to the server 500. The second task request signal basically indicates the same information as the first task request signal, but the task start date indicated by the second task request signal is today (task request date). When the server 500 receives the second task request signal from the mobile equipment UT, the server 500 performs a series of steps shown in FIG. 9, described below, for the user associated with that mobile equipment UT. Every time the server 500 receives a task request from any one of the registered users, the server 500 performs the series of steps shown in FIG. 9 for that user.

Referring to FIG. 9 together with FIGS. 1 to 3, in S101A, the server 500 acquires the operation plan and current status (e.g., location and remaining amount of energy) of each registered vehicle. The server 500 then determines in S102A whether the task requested by the second task request signal is executable by any of the vehicles, based on the operation plan and current status of each vehicle and the content of the task indicated by the second task request signal (e.g., task start information and task end information). For example, the server 500 checks the operation plan and current status of each vehicle. When there is any vehicle available for the operating section for executing the requested task, the server 500 determines that the requested task is executable. When no vehicle is available for the operating section for executing the requested task, the server 500 determines that the requested task is not executable.

When it is determined that the requested task is not executable (NO in S102A), the server 500 performs S105. S105 in FIG. 9 is the same step as S105 in FIG. 5. When it is determined that the requested task is executable (YES in S102A), the server 500 performs S103 and the subsequent steps (S103, S104, S11 to S15). S103, S104, and S11 to S15 in FIG. 9 are the same steps as S103 and S104 in FIGS. 5 and S11 to S15 in FIG. 6, respectively. In this manner, the operation according to the operation plan (operation plan confirmed in S13 or S14) is executed and the requested task is executed on the day the server 500 received the task request.

As described above, the server 500 according to the present embodiment is configured to manage a plurality of vehicles 1. The server 500 determines an operation plan for each of the vehicles 1, and instructs each of the vehicles 1 to operate according to the determined operation plan (S15 in FIGS. 6 and 9). The operation plan includes a plan regarding energy replenishment for operation (see FIG. 7). The server 500 determines based on the operation plan whether a conflict will occur, namely whether two or more vehicles 1 will be replenished with energy at the same location at the same timing (S12 in FIGS. 6 and 9). When it is determined that a conflict will occur, the server 500 changes the operation plan of at least one of the conflicting vehicles 1 so that the conflict is avoided (S14 in FIGS. 6 and 9). In this way, the server 500 causes a plurality of moving objects (e.g., vehicles 1) to operate cooperatively in non-operating sections (energy replenishment sections). This can improve the operation efficiency while avoiding conflicts in the operation system having a small number of available energy replenishment points. The server 500 having the above configuration facilitates an increase in operation efficiency while reducing an increase in amount of operational resources.

Figure 10:
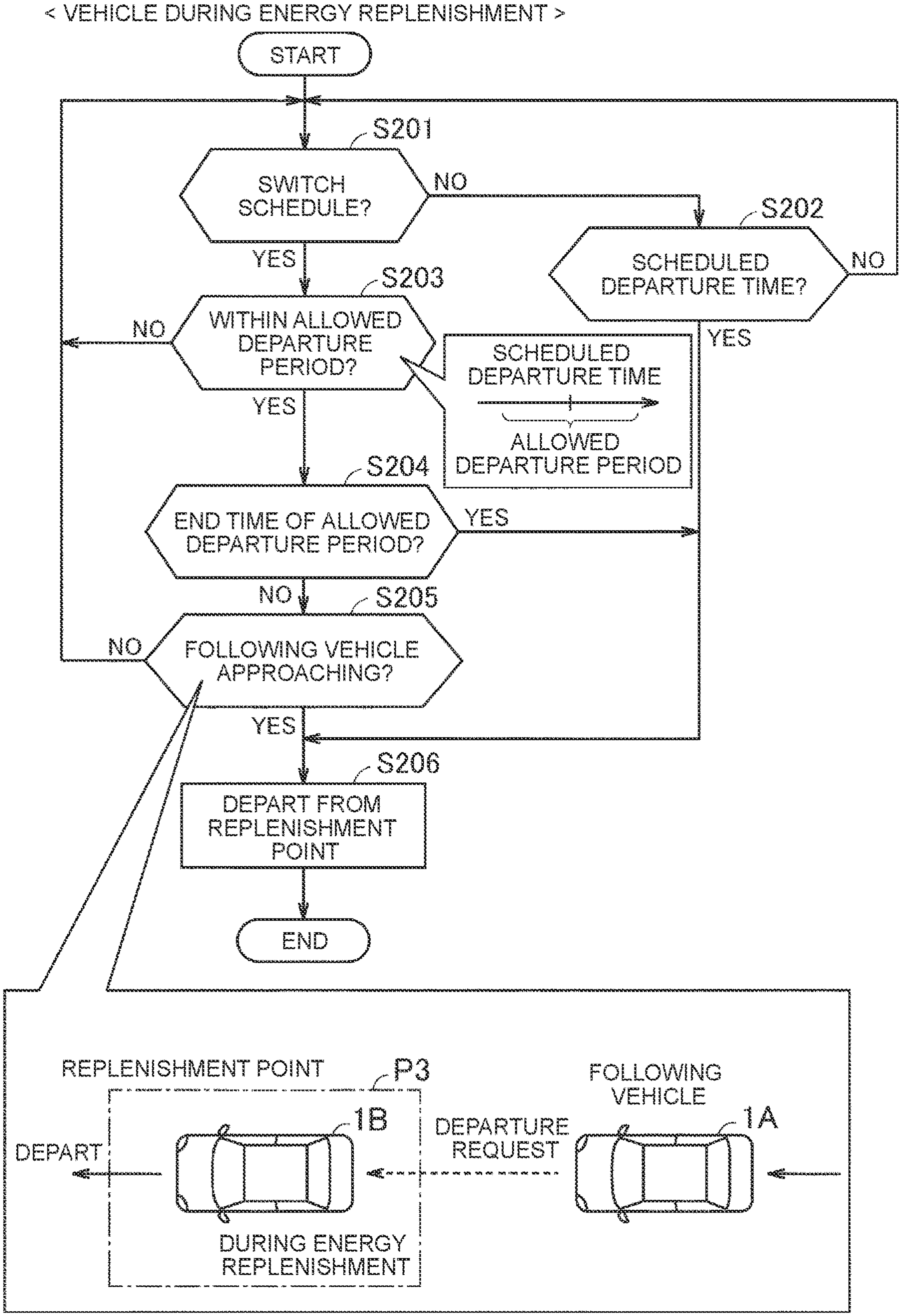
FIG. 10 is a flowchart showing an example of autonomous driving control that is performed by a vehicle during energy replenishment in the operation method according to the embodiment of the present disclosure.

Based on an operation instruction from the server 500 (S15 in FIGS. 6 and 9), the vehicle 1 that is automatically driving according to the operation plan may perform a series of steps shown in FIG. 10 described below during energy replenishment at the energy replenishment point. FIG. 10 is a flowchart showing an example of autonomous driving control that is performed by the vehicle 1 during energy replenishment. In this example, a schedule (switch schedule) in which a preceding vehicle and a following vehicle are switched at an energy replenishment point, namely a following vehicle arrives at an energy replenishment point when a preceding vehicle departs from that energy replenishment point, may be set for each energy replenishment point included in the operation plan. An operation plan including an energy replenishment point with the set switch schedule indicates the time two vehicles are scheduled to be switched (switch time) at that energy replenishment point and the identification information (vehicle IDs) of the vehicles that are scheduled to be switched. When the time a following vehicle is scheduled to arrive at a certain energy replenishment point (scheduled arrival time) is the same as the time a preceding vehicle is scheduled to depart from that energy replenishment point (scheduled departure time), it means that a switch schedule has been set for that energy replacement point. In FIG. 10, the vehicle 1B is being replenished with energy (e.g., performing plug-in charging of the battery 160) at the replenishment point P3. The vehicle 1B is the preceding vehicle. The following vehicle is the vehicle 1A. A series of steps shown in FIG. 10 is performed by, for example, the control device 150 (FIG. 3) of the vehicle 1B.

Referring to FIG. 10 along with FIGS. 1 to 3, in S201, the vehicle 1B determines whether a switch schedule has been set for the replenishment point P3 in the operation plan of the vehicle 1B. When no switch schedule is set for the replenishment point P3 (NO in S201), the vehicle 1B determines in S202 whether the scheduled departure time from the replenishment point P3 indicated by the operation plan of the vehicle 1B has come. The vehicle 1B repeats steps S201, S202 while being replenished with energy at the replenishment point P3 until the scheduled departure time from the replenishment point P3 comes (NO in S202). When the scheduled departure time from the replenishment point P3 comes (YES in S202), the vehicle 1B departs from the replenishment point P3 by autonomous driving in S206.

When the switch schedule has been set for the replenishment point P3 (YES in S201), the vehicle 1B determines in S203 whether the current time is within a predetermined allowed departure period. The allowed departure period is determined based on the scheduled departure time from the replenishment point P3 indicated by the operation plan of the vehicle 1B. The allowed departure period may include, for example, a first allowed departure period and a second allowed departure period that are provided before and after the scheduled departure time. The first allowed departure period is a period from the start time of the allowed departure period to the scheduled departure time. The second allowed departure period is a period from the scheduled departure time to the end time of the allowed departure period.

When the current time is not within the allowed departure period (NO in S203), the process returns to S201. Therefore, the vehicle 1B will not depart from the replenishment point P3 until the start time of the allowed departure period comes. When the current time is within the allowed departure period (YES in S203), the vehicle 1B determines in S204 whether the end time of the allowed departure period has come. When the end time of the allowed departure period has not yet come (NO in S204), the vehicle 1B determines in S205 whether the following vehicle (vehicle 1A) is approaching the replenishment point P3.

When the vehicle 1A is approaching the replenishment point P3 (e.g., when the vehicle 1A is within a predetermined distance from the replenishment point P3), the vehicle 1A may send a departure request signal including its own vehicle 1D to the vehicle 1B by wireless communication. The vehicle 1B may determine whether the vehicle 1A is approaching the replenishment point P3 based on the signal from the vehicle 1A. For example, the vehicle 1B determines that the vehicle 1A is not approaching the replenishment point P3 until it receives a departure request signal. When the vehicle 1D indicated by the received departure request signal matches the vehicle 1D of the following vehicle indicated by the operation plan, the vehicle 1B determines that the vehicle 1A (following vehicle to be switched at the replenishment point P3) is approaching the replenishment point P3.

When the vehicle 1A is not approaching the replenishment point P3 (NO in S205), the process returns to S201. The vehicle 1B waits for arrival of the vehicle 1A during the allowed departure period. When the vehicle 1A is approaching the replenishment point P3 (YES in S205), the vehicle 1B departs from the replenishment point P3 by autonomous driving in S206. The vehicle 1A then enters the replenishment point P3. The vehicles 1A, 1B are thus switched at the replenishment point P3. Even when the vehicle 1A is behind the operation plan and does not arrive at the replenishment point P3 within the allowed departure period and the end time of the allowed departure period comes before the vehicle 1A arrives at the replenishment point P3 (YES in S204), the vehicle 1B departs from the replenishment point P3 by autonomous driving in S206. In this case, the scheduled switching of the vehicles 1A, 1B is not performed.

As described above, in the example shown in FIG. 10, the vehicle 1B (third moving object) departs from the replenishment point P3 when the vehicle 1A (fourth moving object) approaches the replenishment point P3 while the vehicle 1B instructed to operate according to the operation plan including a schedule in which the vehicle 1B and the vehicle 1A are switched at the replenishment point P3 is being replenished with energy at the replenishment point P3. According to such a configuration, the vehicle 1A is more likely to enter the replenishment point P3 exactly when the vehicle 1B leaves the replenishment point P3. Since the preceding vehicle 1B and the following vehicle 1A are switched at the replenishment point P3 (replenishment point P3 does not become vacant), the possibility of the replenishment point P3 being occupied by another vehicle (e.g., a vehicle not related to the operation plan) after the preceding vehicle 1B leaves the replenishment point P3 (namely, the possibility of the following vehicle IA being unable to use the replenishment point P3) can be reduced. Regardless of whether another vehicle has the right to use the replenishment point P3, that vehicle may use the space if it is available.

In the above embodiment, the vehicle 1 is, for example, a driverless robotaxi vehicle. When a robotaxi vehicle receives an operation instruction from the server 500 (S15 in FIGS. 6 and 9), it operates according to the operation plan by autonomous driving. However, the vehicle 1 is not limited to the robotaxi vehicle. The vehicle 1 may be configured so that a driver operates the vehicle 1 according to the operation plan. For example, when the vehicle 1 receives an operation instruction from the server 500, the vehicle 1 may display the content of the operation instruction on an in-vehicle HMI (e.g., NAVI 170). The driver may operate the vehicle 1 according to the operation plan while checking the operation plan on the in-vehicle HMI. However, autonomous vehicle can more easily accurately control the vehicle 1 to travel at the speed designated by the server 500 than manual driving.

The configuration of the vehicle is not limited to the configuration described in the above embodiment (see FIGS. 1 to 3). The base vehicle may have an autonomous driving function with no retrofit. The level of the autonomous driving may be fully autonomous driving (Level 5) or conditional autonomous driving (e.g., Level 4). The configuration of the managed vehicle may be changed as appropriate to a configuration exclusively for unmanned driving. For example, a vehicle exclusively for unmanned driving does not need to include parts for a person to operate the vehicle (such as a steering wheel). The vehicle may be configured to be contactlessly rechargeable.

In the above embodiment, a plurality of vehicles that receives instructions from server 500 have the same configuration. However, the present disclosure is not limited to this, and a plurality of vehicles managed by the server 500 may have different configurations. The vehicles may include at least one of the following types of vehicles instead of or in addition to a BEV with no internal combustion engine: xEVs with an internal combustion engine (HEV, PHEV), an FCEV, and an internal combustion engine vehicle with no traction electric motor. The vehicle is not limited to a passenger car, and may be a bus or a truck. The vehicle may be a multipurpose vehicle that is customized according to the user's purpose of use. A moving object other than the vehicle (railroad car, ship, airplane, walking robot, robot cleaner, drone, space probe, etc.) may be used instead of or in addition to the vehicle. The moving object may be configured to be remotely controllable. The energy replenish point may be any location where the moving object can be replenished with energy.

The task is not limited to the transport described above. The task may be any task that can be executed by the moving object, such as a mobile store, a mobile office, or a mobile medical clinic (medical task).

The embodiment and various modifications described above may be carried out in any combination.

The embodiment disclosed herein should be considered to be illustrative in all respects and not restrictive. The technical scope of the present disclosure is shown by the claims rather than by the above description of the embodiment, and is intended to include all modifications within the meaning and scope equivalent to those of the claims.

What is claimed is:

1. A server that manages a plurality of moving objects, the server comprising a processor configured to:

determine an operation plan for each of the moving objects, and instruct each of the moving objects to operate according to the determined operation plan, the operation plan including a plan regarding energy replenishment for operation, wherein each of the moving objects is configured to receive an instruction from the server;

determine based on the operation plan whether a conflict is going to occur, the conflict being two or more of the moving objects being replenished with energy at a same location at a same timing, in a case that determination is made that the conflict is going to occur, change the operation plan of at least one of the conflicting moving objects in such a manner that the conflict is avoided, wherein the operation plan includes an energy replenishment point and a period of stay at the energy replenishment point, wherein the moving objects include a first moving object, a second moving object, a third moving object and a fourth moving object, when determination is made based on the operation plan that a first moving object and a second moving object are going to conflict at the energy replenishment point, and a remaining amount of energy in the first moving object at a conflict occurrence time predicted from the operation plan is greater than a reference amount, change the period of stay of the first moving object at the energy replenishment point, before instructing each of the moving objects to operate, in such a manner that the first moving object departs from the energy replenishment point at the conflict occurrence time;

wherein each of the third moving object and the fourth moving object is an autonomous vehicle, and the third moving object is instructed to operate according to the operation plan including a schedule in which the third moving object and the fourth moving object are switched at an energy replenishment point is configured to depart from the energy replenishment point in a case that the fourth moving object approaches the energy replenishment point while the third moving object is staying at the energy replenishment point;

wherein the third moving object is configured to receive the departure request signal from the fourth moving object while the third moving object is staying at the energy replenishment point;

wherein in a case that the vehicle 1D indicated by the received departure request signal matches the vehicle 1D of the fourth moving object indicated by the operation plan, the third moving object is configured to determine that the fourth moving object is approaching the energy replenishment point.

2. The server according to claim 1, wherein the processor is configured to, when, before instructing each of the moving objects to operate, determination is made based on the operation plan that the first moving object and the second moving object are going to conflict at the energy replenishment point, and the remaining amount of energy in the first moving object at the conflict occurrence time is less than the reference amount, change the period of stay of the first moving object at the energy replenishment point in such a manner that the first moving object departs from the energy replenishment point at a timing when the remaining amount of energy in the first moving object reaches the reference amount.

3. The server according to claim 1, wherein the processor is configured to change an energy replenishment point in the operation plan of at least one of the conflicting moving objects in such a manner that the conflict is avoided.

4. The server according to claim 1, wherein the processor is configured to, when there is a plurality of the operation plans that is able to avoid the conflict, select the operation plan with a lowest risk of running out of energy out of the operation plans.

5. The server according to claim 1, wherein the processor is configured to, when there is a plurality of the operation plans that is able to avoid the conflict, select the operation plan with highest energy efficiency out of the operation plans.

* * * * *